(12) United States Patent
Mori

(10) Patent No.: US 10,853,005 B2
(45) Date of Patent: Dec. 1, 2020

(54) IMAGE PROCESSING APPARATUS AND IMAGE PROCESSING METHOD

(71) Applicant: CANON KABUSHIKI KAISHA, Tokyo (JP)

(72) Inventor: Hiroshi Mori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/372,109

(22) Filed: Apr. 1, 2019

(65) Prior Publication Data

US 2019/0310810 A1 Oct. 10, 2019

(30) Foreign Application Priority Data

Apr. 5, 2018 (JP) .................................. 2018-073489

(51) Int. Cl.
*G06F 3/12* (2006.01)
*G06K 15/02* (2006.01)

(52) U.S. Cl.
CPC .......... *G06F 3/1215* (2013.01); *G06F 3/1242* (2013.01); *G06F 3/1245* (2013.01); *G06F 3/1248* (2013.01); *G06K 15/1849* (2013.01); *G06K 15/1865* (2013.01)

(58) Field of Classification Search
CPC .... G06F 3/1215; G06F 3/1245; G06F 3/1242; G06F 3/1248; G06K 15/1865; G06K 15/1849
USPC ........................................................ 358/1.16
See application file for complete search history.

(56) References Cited

U.S. PATENT DOCUMENTS

| 6,587,655 B2* | 7/2003 | Maekawa | G06K 15/12 358/1.17 |
|---|---|---|---|
| 6,587,735 B1* | 7/2003 | Yaguchi | H04N 1/00954 358/1.9 |
| 2006/0132857 A1* | 6/2006 | Akashi | G06K 15/02 358/448 |
| 2007/0195353 A1* | 8/2007 | Tsunoda | G06K 15/1822 358/1.13 |
| 2008/0291496 A1* | 11/2008 | Hara | G06K 15/02 358/1.16 |
| 2009/0237728 A1* | 9/2009 | Yamamoto | H04N 1/00474 358/1.15 |
| 2009/0279110 A1* | 11/2009 | Ito | G06K 1/121 358/1.5 |
| 2010/0115517 A1* | 5/2010 | Tamura | H04N 1/00217 718/100 |

FOREIGN PATENT DOCUMENTS

JP 3285930 B2 5/2002

* cited by examiner

*Primary Examiner* — Allen H Nguyen
(74) *Attorney, Agent, or Firm* — Canon U.S.A., Inc. IP Division

(57) ABSTRACT

An image processing apparatus includes at least one of one or more processors configured to implement instructions stored in a memory device and an integrated circuit that execute a first acquiring task of acquiring data of a first object from a first memory by designating an address in the first memory, a second acquiring task of acquiring data of a second object from a second memory by a first-in first-out (FIFO) scheme, and a bitmap image generation task of generating a bitmap image including at least the first object and the second object based on the data acquired in the first acquiring task and the data acquired in the second acquiring task.

14 Claims, 18 Drawing Sheets

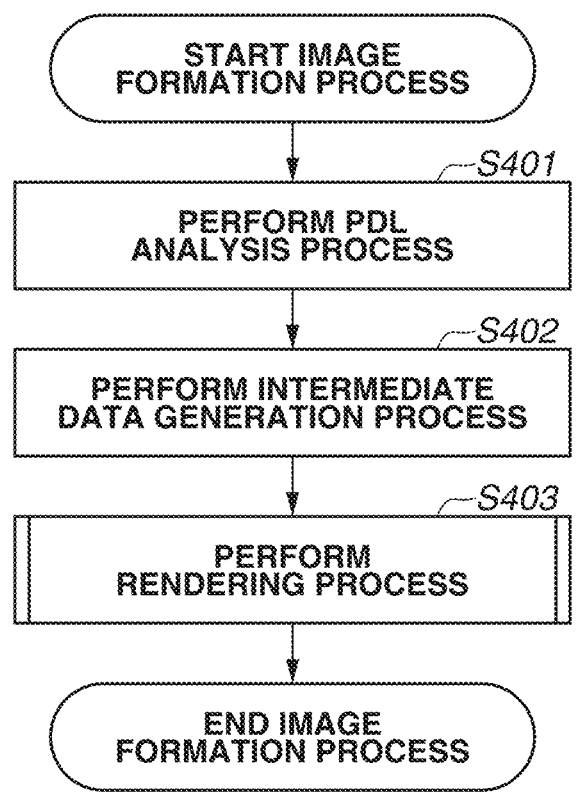

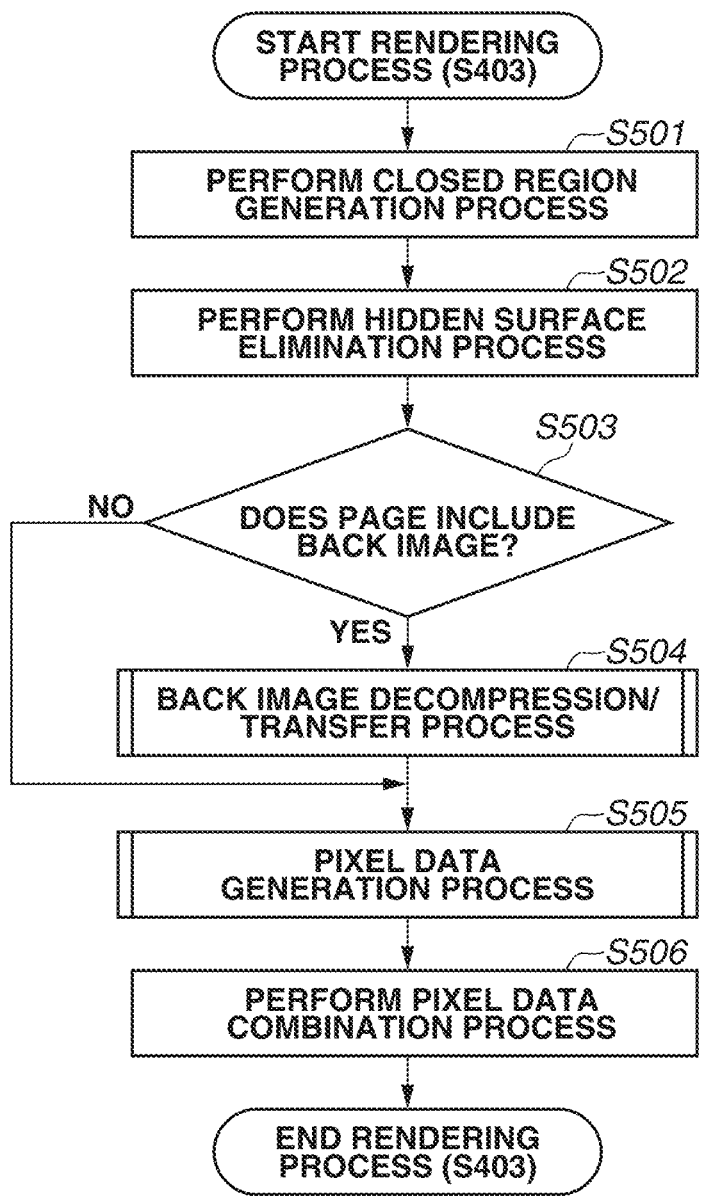

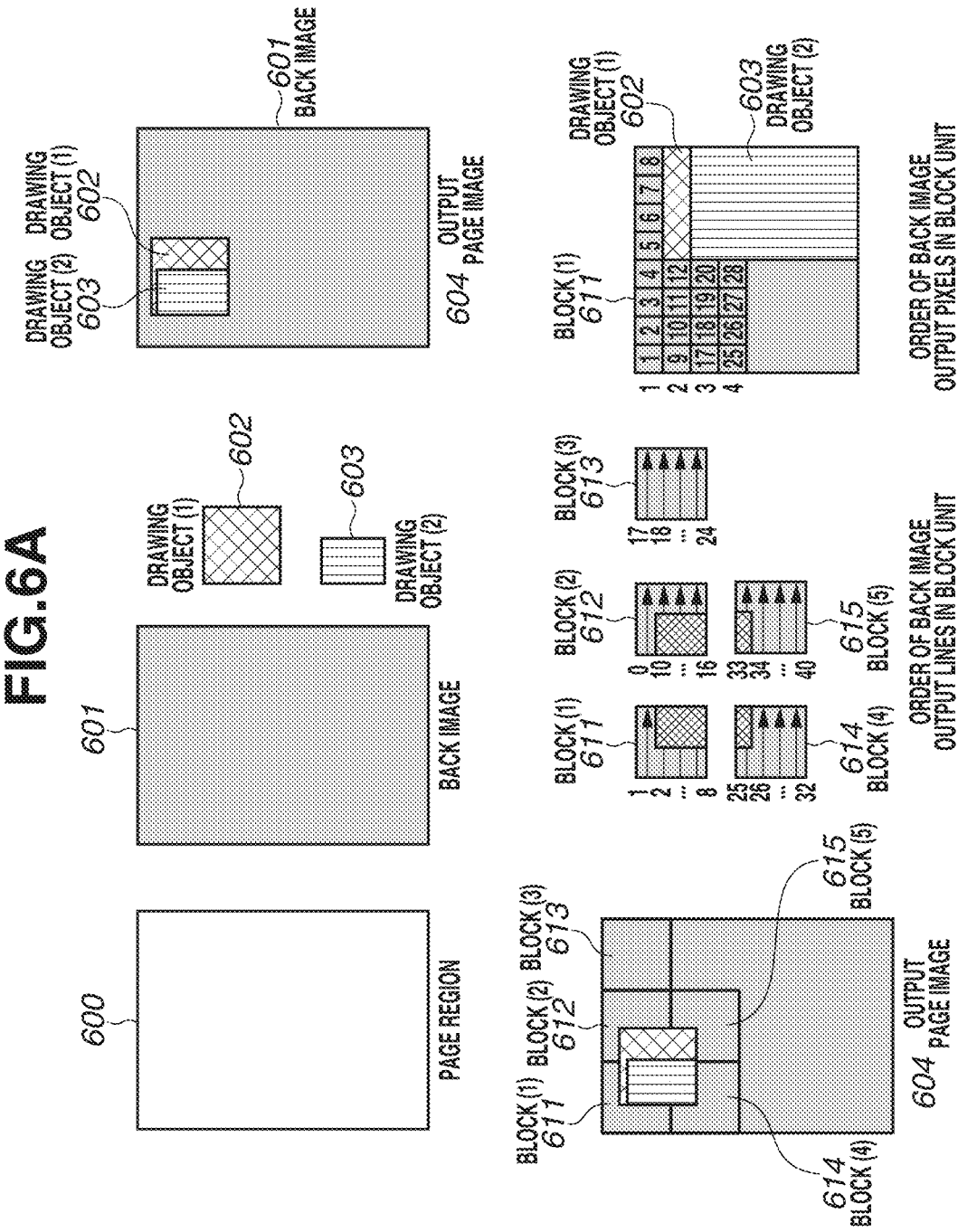

FIG.7A

DATA STRUCTURE OF CLOSED REGION

| | | | |
|---|---|---|---|
| | | | FILL TYPE: IMAGE (LONGITUDINAL LINE) COMBINATION: OVERWRITE |
| | | | FILL TYPE: IMAGE (LONGITUDINAL LINE) COMBINATION: OVERWRITE |
| | | FILL TYPE: IMAGE (INTERSECTION) COMBINATION: TRANSMISSION | FILL TYPE: IMAGE (INTERSECTION) COMBINATION: TRANSMISSION |
| FILL TYPE: BACK IMAGE COMBINATION: OVERWRITE | FILL TYPE: BACK IMAGE COMBINATION: OVERWRITE | FILL TYPE: BACK IMAGE COMBINATION: OVERWRITE | FILL TYPE: BACK IMAGE COMBINATION: OVERWRITE | FILL TYPE: BACK IMAGE COMBINATION: OVERWRITE | FILL TYPE: BACK IMAGE COMBINATION: OVERWRITE | FILL TYPE: BACK IMAGE COMBINATION: OVERWRITE |
| PIXEL LENGTH: 8 pix NUMBER OF OBJECTS: 1 | PIXEL LENGTH: 4 pix NUMBER OF OBJECTS: 1 | PIXEL LENGTH: 4 pix NUMBER OF OBJECTS: 2 | PIXEL LENGTH: 4 pix NUMBER OF OBJECTS: 1 | PIXEL LENGTH: 4 pix NUMBER OF OBJECTS: 3 | PIXEL LENGTH: 4 pix NUMBER OF OBJECTS: 1 | PIXEL LENGTH: 4 pix NUMBER OF OBJECTS: 3 |
| CLOSED REGION (1) 621 | CLOSED REGION (2) 622 | CLOSED REGION (3) 623 | CLOSED REGION (4) 624 | CLOSED REGION (5) 625 | CLOSED REGION (6) 626 | CLOSED REGION (7) 627 |

LINE 1: 621, 622
LINE 2: 623
LINE 3: 624, 625
LINE 4: 626, 627

611 BLOCK (1)

FIG.7B

DATA STRUCTURE OF CLOSED REGION
(AFTER ELIMINATION OF HIDDEN SURFACE)

| | PIXEL LENGTH / NUMBER OF OBJECTS | FILL TYPE / COMBINATION | FILL TYPE / COMBINATION |
|---|---|---|---|
| CLOSED REGION (1) 621 | PIXEL LENGTH: 8 pix NUMBER OF OBJECTS: 1 | FILL TYPE: BACK IMAGE COMBINATION: OVERWRITE | |
| CLOSED REGION (2) 622 | PIXEL LENGTH: 4 pix NUMBER OF OBJECTS: 1 | FILL TYPE: BACK IMAGE COMBINATION: OVERWRITE | |
| CLOSED REGION (3) 623 | PIXEL LENGTH: 4 pix NUMBER OF OBJECTS: 1 | FILL TYPE: BACK IMAGE COMBINATION: OVERWRITE | FILL TYPE: IMAGE (INTERSECTION) COMBINATION: TRANSMISSION |
| CLOSED REGION (4) 624 | PIXEL LENGTH: 4 pix NUMBER OF OBJECTS: 2 | FILL TYPE: BACK IMAGE COMBINATION: OVERWRITE | |
| CLOSED REGION (5) 625 | PIXEL LENGTH: 4 pix NUMBER OF OBJECTS: 2 | FILL TYPE: BACK IMAGE (READ AND DISCARD) COMBINATION: OVERWRITE | FILL TYPE: IMAGE (LONGITUDINAL LINE) COMBINATION: OVERWRITE |
| CLOSED REGION (6) 626 | PIXEL LENGTH: 4 pix NUMBER OF OBJECTS: 1 | FILL TYPE: BACK IMAGE COMBINATION: OVERWRITE | |
| CLOSED REGION (7) 627 | PIXEL LENGTH: 4 pix NUMBER OF OBJECTS: 2 | FILL TYPE: BACK IMAGE (READ AND DISCARD) COMBINATION: OVERWRITE | FILL TYPE: IMAGE (LONGITUDINAL LINE) COMBINATION: OVERWRITE |

LINE 1: closed regions 621
LINE 2: closed regions 622, 623
LINE 3: closed regions 624, 625
LINE 4: closed regions 626, 627

611 BLOCK (1)

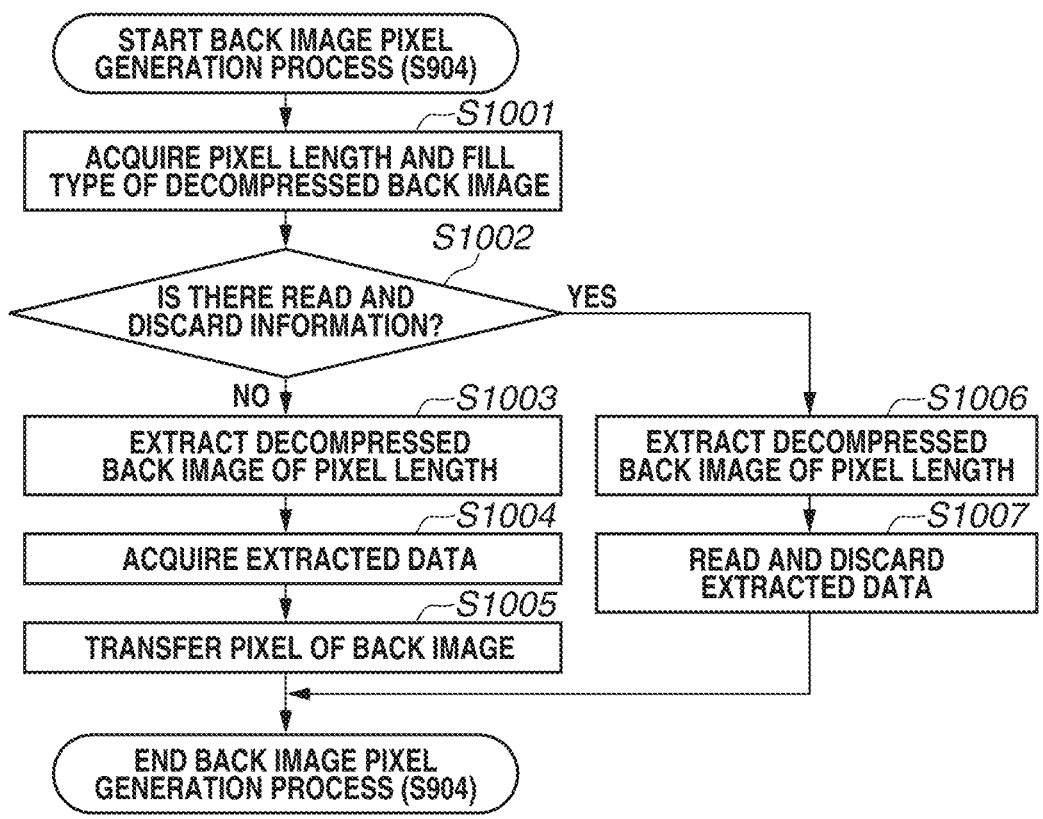
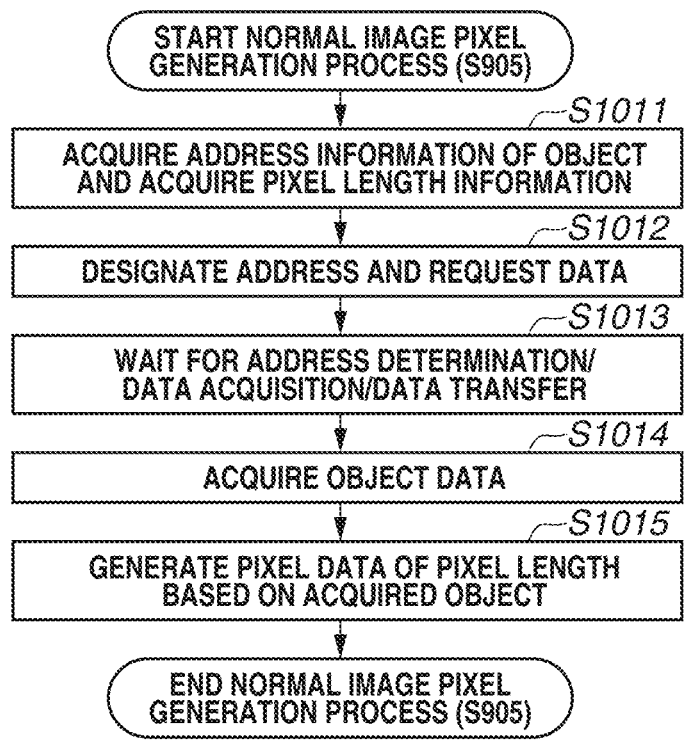

IMAGE PROCESSING APPARATUS AND IMAGE PROCESSING METHOD

BACKGROUND OF THE INVENTION

Field of the Invention

The aspect of the embodiments relates to an image processing apparatus and an image processing method. The image processing apparatus is used as an apparatus such as a printer, a multi-function peripheral, and a fax machine.

Description of the Related Art

Conventionally, an image forming apparatus such as a multi-function peripheral (hereinafter referred to as an MFP) has been known as an apparatus for forming an image on a sheet. In such an image forming apparatus, an image generation process of generating an image based on print data including a plurality of drawing objects is performed. As one of methods of the image generation process, there is a method of combining a plurality of drawing objects in order of scan lines (hereinafter, this method referred to as a scan line image generation method).

In the scan line image generation method, a plurality of drawing objects existing on the scan lines is stored in a memory such as a general-purpose random-access memory (RAM), and related drawing objects are read from the general-purpose RAM at a time of a combination process of pixels. As one of the drawing objects used in the combination process described above, there is a back image disposed on the back most side of all the drawing objects.

Japanese Patent No. 3285930 discloses a configuration in which a back image is generated at a time of a fallback process and is used for the combination process. The fallback process is a process of securing a free space of a memory by rasterizing a plurality of stored drawing objects into one piece of bitmap image data in a case where remaining storage capacity of the memory storing the drawing objects becomes small. As described above, by combining the generated bitmap image data (back image) and the rest of the drawing objects, an image forming apparatus discussed in Japanese Patent No. 3285930 can execute an image generation process on a page including a large number of drawing objects.

However, in the image forming apparatus discussed in Japanese Patent No. 3285930, there is room for improving a processing speed of the image generation process. This is because a long waiting time is generated in order to read a large amount of data such as the back image data from a general-purpose RAM in the image forming apparatus disclosed in Japanese Patent No. 3285930. The reason will be described in detail below.

As in Japanese Patent No. 3285930, in a case where the drawing objects are stored in the general-purpose RAM and are used, the drawing objects are managed using address information. As described above, in a case where the drawing objects managed by the address information are read from the general-purpose RAM, the following process is performed. Specifically, after the address information is notified to a control module of the general-purpose RAM, it is necessary to wait until the control module completes a loading process for transferring the drawing objects. The loading process tends to require a longer time as a data size of the drawing object becomes larger. For this reason, when a drawing object having a large data size like the back image is to be read from the general-purpose RAM like other drawing objects, the image generation process takes a long time.

SUMMARY OF THE INVENTION

According to an aspect of the embodiments, an apparatus includes at least one of one or more processors configured to implement instructions stored in a memory device and an integrated circuit that execute a first acquiring task of acquiring first data of a first object from a first memory by designating an address in the first memory, a second acquiring task of acquiring second data of a second object from a second memory by a first-in first-out (FIFO) scheme, and a bitmap image generation task of generating a bitmap image including at least the first object and the second object based on the data acquired in the first acquiring task and the data acquired in the second acquiring task.

Further features of the disclosure will become apparent from the following description of exemplary embodiments with reference to the attached drawings.

BRIEF DESCRIPTION OF THE DRAWINGS

FIG. 4 is a flowchart illustrating a flow of a series of processes of a page description language (PDL) data print process.

FIG. 5 is a flowchart illustrating a detailed flow of a rendering process performed by the RIP.

FIG. 6A is a diagram illustrating closed regions in an image generation process.

FIG. 7A is a diagram illustrating data structures of the closed regions, and FIG. 7B is a diagram illustrating data structures of the closed regions (after elimination of a hidden surface).

FIG. 10A is a flowchart illustrating a flow of a back image pixel generation process, and FIG. 10B is a flowchart illustrating a flow of a normal image pixel generation process.

DESCRIPTION OF THE EMBODIMENTS

Hereinafter, forms for carrying out the disclosure will be described in detail with reference to exemplary embodiments. Note that the disclosure is not limited only to contents described according to the exemplary embodiments. In a range in which a similar effect can be obtained, configurations in the exemplary embodiments may be replaced by equivalents thereof.

<Printing System>

Figure 1A:
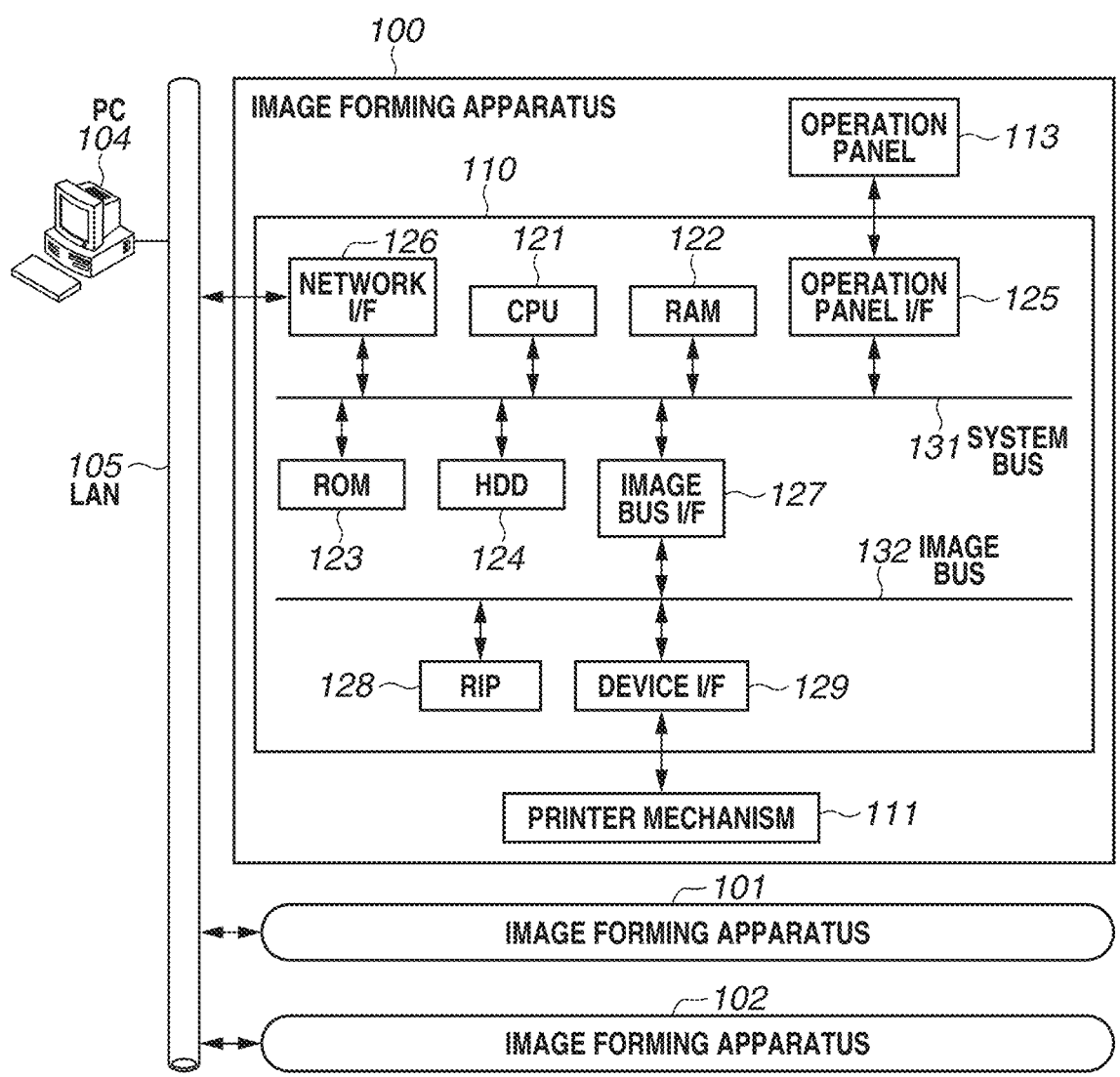
FIG. 1A is a block diagram illustrating a configuration of a printing system.

In a first exemplary embodiment, an example in which the disclosure is implemented in a printing system to be described below will be described. FIG. 1A is a block diagram illustrating a configuration of a printing system. In the present system (printing system), a personal computer (PC) 104 serving as a host computer and image forming apparatuses 100, 101, and 102 are connected to each other through a local area network (LAN) 105.

The image forming apparatuses 100, 101, and 102 each form an image on a sheet. The image forming apparatus 100 may be a multi-function peripheral (MFP) or a single function peripheral (SFP).

The PC 104 is an information processing terminal that can be operated by a user. A printer driver is installed in the PC 104, and an instruction command for printing desired data such as document data can be transmitted to the image forming apparatus 100.

Figure 1B:
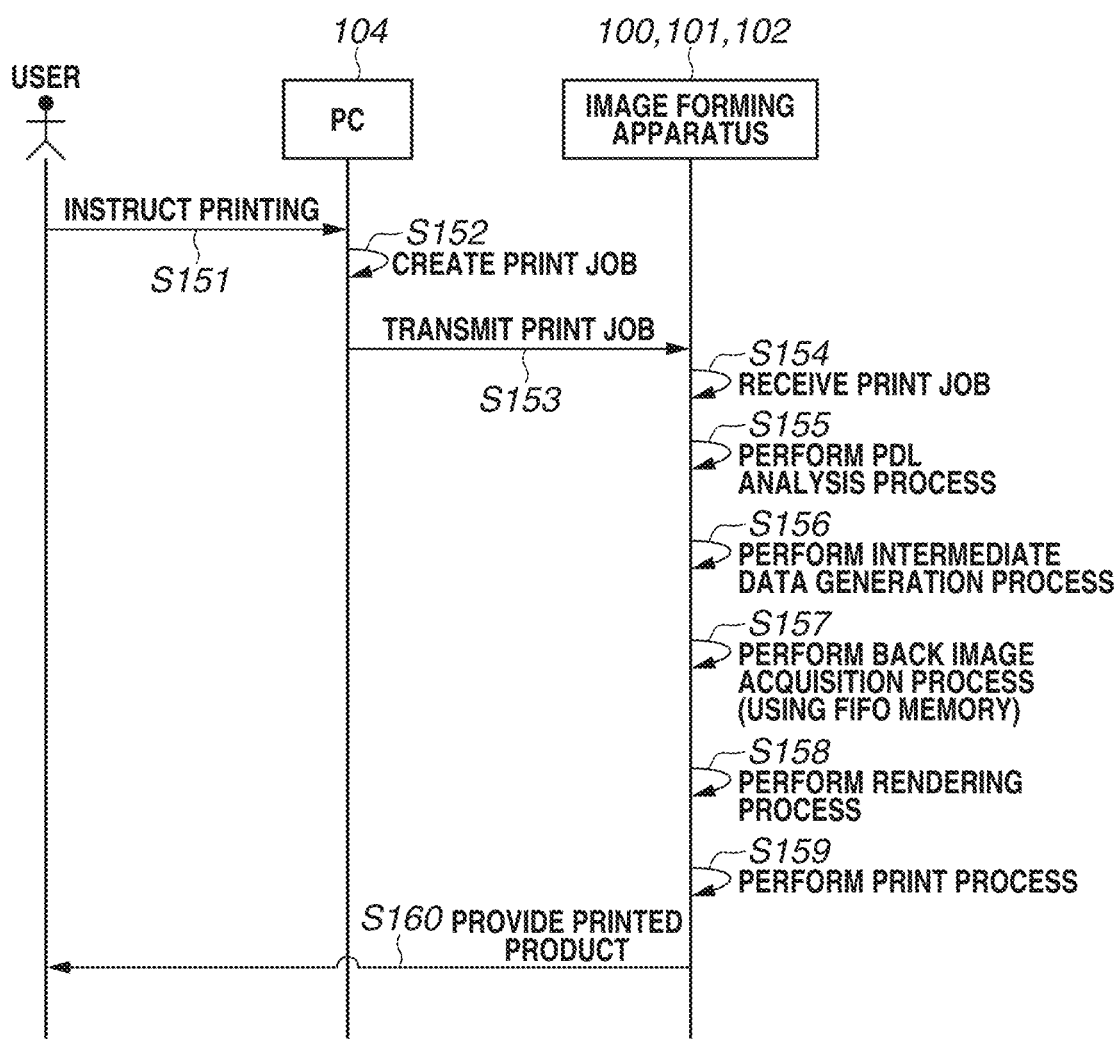
FIG. 1B is a sequence diagram illustrating a flow of use of the printing system.

Next, a flow of use of the present printing system will be described. FIG. 1B is a sequence diagram illustrating a flow of use of the printing system.

In a case where the present printing system is used, the user operates the PC 104 to select a document on which he/she wants to perform printing, and instructs printing in step S151. Then, in step S152, the printer driver in the PC 104 performs a creation process of print job data based on the document instructed by the user. Then, in step S153, the printer driver in the PC 104 performs a procedure for transmitting the print job data to the image forming apparatus 100. In step S154, the image forming apparatus 100 receives the print job data transmitted from the PC 104. Next, in step S155, the image forming apparatus 100 performs an analysis process of page description language (PDL) data included in the received print job. Next, in step S156, the image forming apparatus 100 performs a generation process of intermediate data for generation of a bitmap image based on information of the analyzed PDL data. In addition, in a case where back image data is required for generation of the bitmap image, the back image data is acquired through a first-in first-out (FIFO) memory in step S157. Next, in step S158, the image forming apparatus 100 performs a rendering process based on the intermediate data or the back image data and generates bitmap image data representing a page image. In step S159, the image forming apparatus performs predetermined image processing on the generated bitmap image data and then performs a print process based on the image. In step S160, a product output by the printing is acquired by the user.

As described above, in the present printing system, the FIFO memory is used to acquire the back image in a series of a flow of the print process. With this arrangement, a time required for acquisition of the back image is reduced, and it is possible to reduce a waiting time for image generation and a waiting time for the print process.

<Image Forming Apparatus>

Next, a detailed configuration of the image forming apparatus 100 will be described with reference to FIG. 1A.

As illustrated in FIG. 1A, the image forming apparatus 100 includes a controller 110, a printer mechanism 111, and an operation panel 113.

The operation panel 113 is a reception device that receives a user operation. The operation panel 113 includes a touch panel and hardware keys. The touch panel includes a liquid crystal screen and a touch detection sheet. The touch panel functions as a display device by displaying information on the liquid crystal screen and functions as a reception unit that receives a touch operation of the user with the touch detection sheet.

The printer mechanism 111 is a mechanical system (image forming device) that implements printing by forming an image on a sheet (paper). The method for implementing the printing may be an electrophotographic method or an inkjet method.

The controller 110 is a control device that controls various configurations of the image forming apparatus 100, and is particularly an image processing apparatus that performs control related to image processing. The controller 110 includes a central processing unit (CPU) 121, a random-access memory (RAM) 122, a read only memory (ROM) 123, a hard disk drive (HDD) 124, an operation panel interface (I/F) 125, a network I/F 126, an image bus I/F 127, a raster image processor (RIP) 128, a device I/F 129, a system bus 131, and an image bus 132.

The CPU 121 is a processor that performs various arithmetic operating processes. The CPU 121 implements various functions by software by reading and executing a program.

The RAM 122 is a system work memory for the CPU 121 to operate. In addition, the RAM 122 functions as a memory that temporarily stores various data. The data temporarily stored in the RAM 122 is, for example, PDL data, intermediate data generated in the image forming apparatus for a print process, rendering process data, or image data.

The ROM 123 is a boot ROM, and stores a boot program of the system. The boot program is read and executed by the CPU 121.

The HDD 124 is a storage device capable of storing a large amount of data. The HDD 124 stores system software for various processes and a large number of PDL data.

The operation panel I/F 125 is an input/output interface for exchanging information between the operation panel 113 and the CPU 121. The operation panel I/F 125 outputs operation screen data output by the CPU 121 to the operation panel 113. The operation panel I/F 125 transmits an input signal generated by the user operating the operation panel 113 to the CPU 121.

The network I/F 126 is an input/output interface for connecting to the LAN 105 to input and output information to and from an external apparatus. The units described above are arranged on the system bus 131, and are communicably connected to each other through the system bus 131.

The image bus I/F 127 is an input/output interface for connecting the system bus 131 and the image bus 132 to each other, and is a bus bridge that converts a data structure between the system bus 131 and the image bus 132. The image bus 132 is a communication bus for transferring image data at a high speed. On the image bus 132, the RIP 128 and the device I/F 129 are communicably connected to each other.

The RIP 128 is an image processing unit that analyzes intermediate data (display list) generated based on PDL data and rasterizes the intermediate data into an image. The RIP 128 may be implemented by any one of software and hardware.

The device I/F 129 is an input/output interface for exchanging data between the printer mechanism 111 and the image forming apparatus 100. The device I/F 129 performs synchronous/asynchronous conversion of the image data.

<Software Configuration in Image Forming Apparatus>

Figure 2:
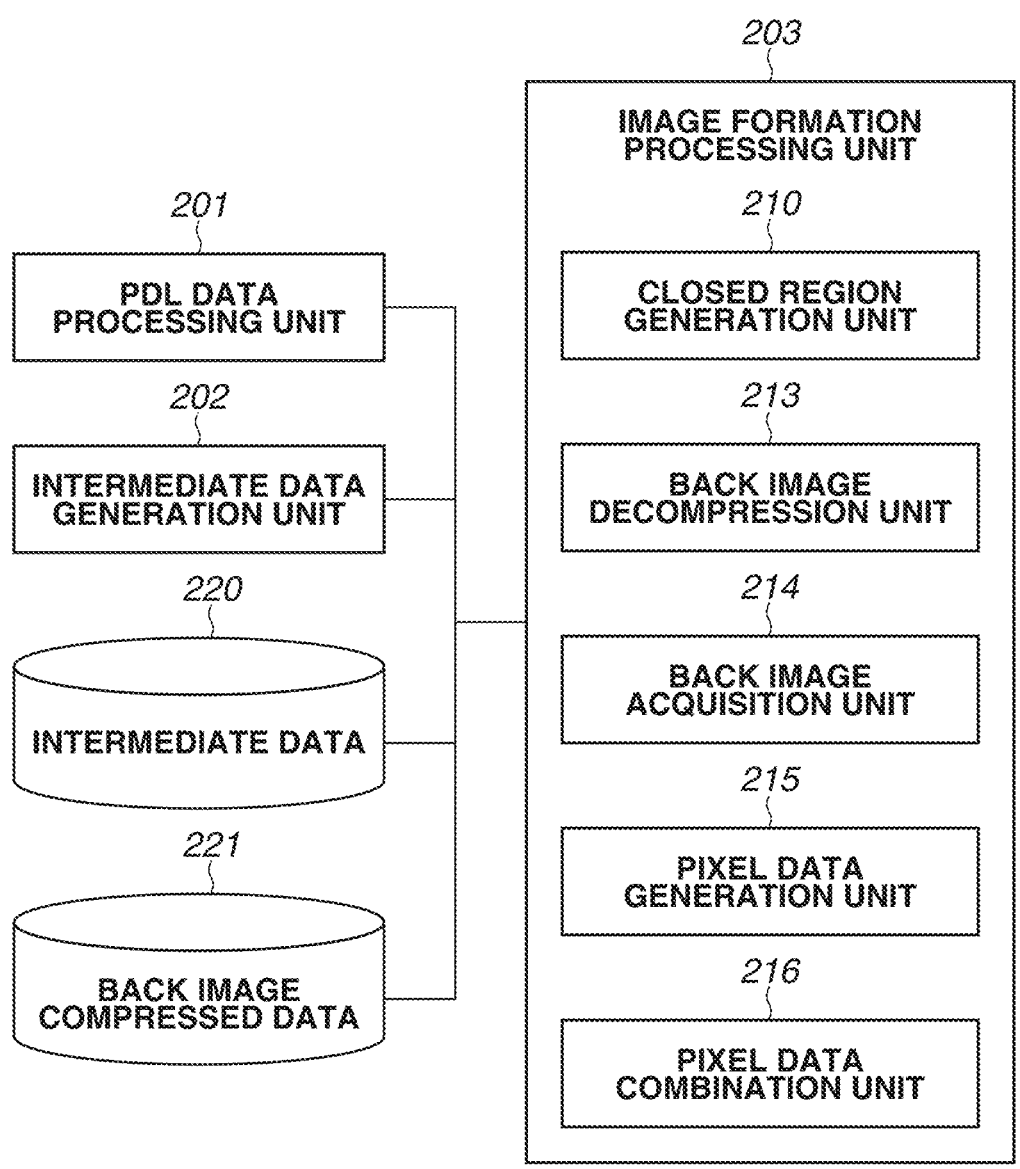
FIG. 2 is a block diagram illustrating a functional configuration of an image forming apparatus.

FIG. 2 is a block diagram illustrating a functional configuration of the image forming apparatus 100. A PDL data processing unit 201 is a processing module that analyzes PDL data. The PDL data processing unit 201 performs a process of acquiring page information from the PDL data and acquiring an object included in the page information, and performs a process of transferring the acquired page information and the acquired object to an intermediate data generation unit 202.

The intermediate data generation unit 202 is a processing module that performs a generation process of intermediate data. The intermediate data generation unit 202 performs a generation process of intermediate data 220 used for an image formation process based on the page information and object information transferred from the PDL data processing unit 201. The intermediate data 220 is stored in the RAM 122.

The image formation processing unit 203 is a processing module that performs a generation process of bitmap data indicating image information, based on the intermediate data 220 transferred from the intermediate data generation unit 202 and used for the image formation process. The image formation processing unit 203 includes a closed region generation unit 210, a back image decompression unit 213, a back image acquisition unit 214, a pixel data generation unit 215, and a pixel data combination unit 216, as illustrated in FIG. 2.

The closed region generation unit 210 is a processing module that performs a generation process of closed region information. The closed region information is calculated based on contour information of a drawing object. The closed region generation unit 210 generates the closed region information based on the intermediate data 220. The closed region information will be described in detail below. The closed region generation unit 210 determines combined information of the respective objects included in the acquired closed region information, and generates closed region information including objects required for the image formation process (hereinafter referred to as a hidden surface elimination process). The closed region information includes information regarding whether a back image is included.

The back image decompression unit 213 is a processing module that performs a decompression process of compressed data (compressed image data). The back image decompression unit 213 decompresses back image compressed data 221. The back image compressed data 221 is image data in a compressed state, and it is assumed that the back image compressed data 221 is stored in advance in the RAM 122. When the back image compressed data 221 is designated as the back image by a PDL command or the like, the back image compressed data 221 is read from the RAM 122 and is transmitted to the back image decompression unit 213. Pixel data of the back image decompressed by the back image decompression unit 213 is stored in a FIFO-type memory in a predetermined order.

The back image acquisition unit 214 is a processing module for acquiring the pixel data of the back image from the FIFO memory. In addition, the back image acquisition unit 214 performs a process of transferring the acquired pixel data of the back image to the pixel data generation unit 215. The back image acquisition unit 214 performs a process of acquiring the back image based on closed region information including a back image object. The back image acquisition unit 214 transfers the acquired back image to the pixel data generation unit 215.

The pixel data generation unit 215 is a processing module that generates pixel data for each drawing object existing in each closed region. The generated pixel data is transmitted to the pixel data combination unit 216. In addition, the pixel data generation unit 215 also transmits the pixel data of the back image acquired from the back image acquisition unit 214 to the pixel data combination unit 216. In addition, the pixel data generation unit 215 performs, using a known technique, a generation process of pixel data on a normal object designated for the image formation process, based on information of the designated object.

The pixel data combination unit 216 is a processing module that combines pixel data. The pixel data combination unit 216 performs a combination process of the pixel data based on the closed region information. This process is carried out using a known technique. The pixel data combination unit 216 generates a bitmap image as a final product. In addition, in a fallback process, the pixel data combination unit 216 generates a back image for combination. The fallback process is a process of storing, in a predetermined memory, compressed image data obtained by compressing the pixel data generated based on the intermediate data, in a case where a total of sizes of the generated pixel data exceeds a predetermined size. The predetermined memory is, for example, the RAM 122. For example, an example will be described in which bitmap data including an object 1, an object 2, and an object 3 is generated. In a case where the total of sizes of pixel data of the objects 1 and 2 exceeds a predetermined size, pixel data of an image (back image) including the objects 1 and 2 is generated, compressed, and stored in the RAM 122. The back image in the fallback process is stored in a memory inside the RIP 128 as the back image compressed data 221. The back image compressed data 221 is then read by the back image decompression unit 213, subjected to a decompression process, stored in a communication memory (0) 320, and used for the image formation process. For example, the bitmap data including the objects 1 to 3 is generated by combining pixel data obtained by decompressing the pixel data of the back image including the objects 1 and 2 with pixel data of the object 3.

The back image may not necessarily be an image generated by the fallback process. For example, the back image may be a back image designated by a predetermined application (e.g., document application such as PowerPoint), or a back image designated by a copy-forgery-inhibited-pattern or a form. In other words, a background image object, a copy-forgery-inhibited-pattern image object, or a form image object may be used as a drawing object used for combination. In that case, the PDL data processing unit 201 transmits the back image compressed data 221 obtained by analysis to the back image decompression unit 213. The decompressed pixel data is transferred to the back image acquisition unit 214 through the FIFO-type memory.

Conventionally, pixel data indicating a back image is rasterized in the general-purpose RAM 122 when necessary, and is read out from the general-purpose RAM 122. In that case, since the RAM 122 is accessed through the image bus I/F 127, there are a large number of devices to be passed through, so that it takes time to access the RAM 122. The RAM 122 is excellent in general-versatility because the RAM 122 is an address designation-type memory and can store data at a randomly designated address. On the other hand, the RAM 122 is to perform a process of loading data corresponding to the designated address at a time of loading data. For this reason, in a case of accessing a large amount of data, a long waiting time is generated.

In the present exemplary embodiment, the data is loaded in the FIFO-type memory inside the RIP 128, so that the devices to be passed through are eliminated to achieve high-speed access. In addition, in the FIFO-type memory, a data storage location is constant, and thus there is no need to identify an address of the data. For this reason, when access to the data is requested, the data can be transferred without performing a process for identifying the address. As described above, a high-speed data loading process can be achieved by saving a time required for identifying the address.

<Hardware and Software Configurations in RIP 128>

Figure 3A:
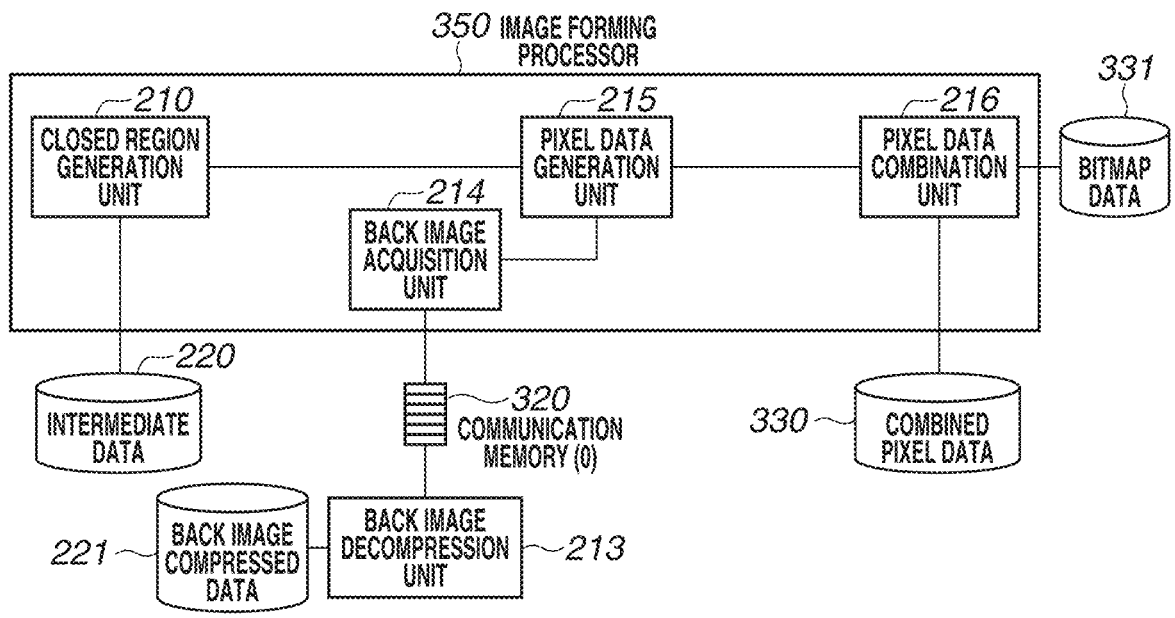
FIG. 3A is a block diagram illustrating a detailed configuration of a raster image processor (RIP)
Figure 3B:
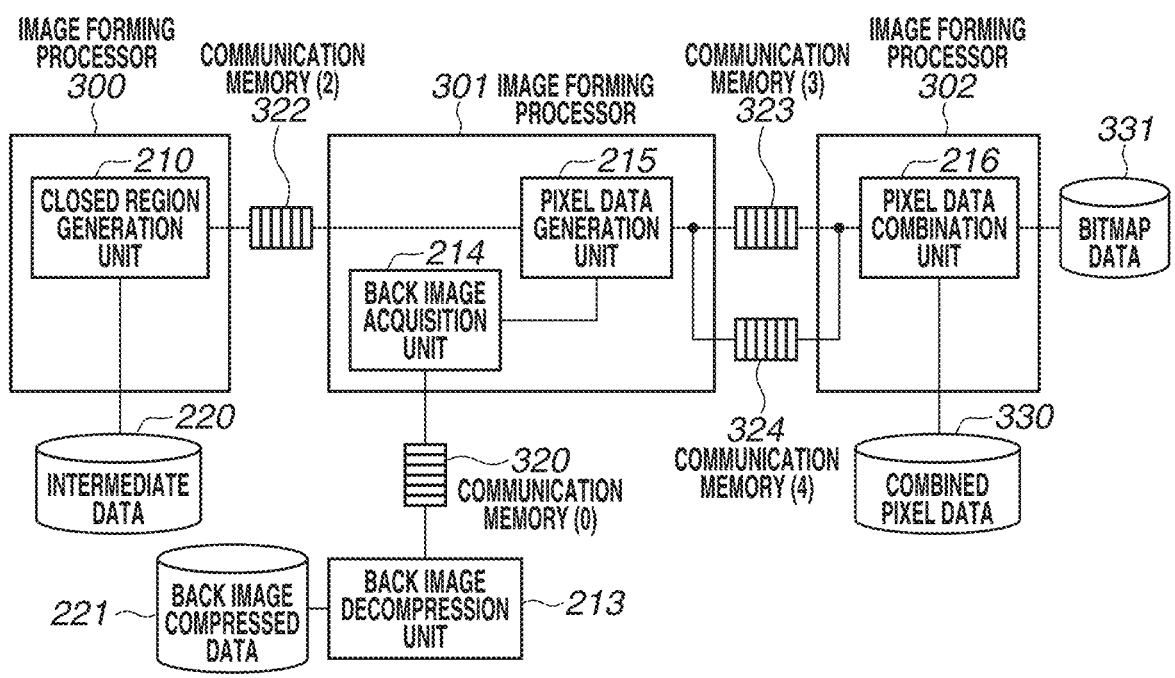
FIG. 3B is a block diagram illustrating a modified example of the RIP.

FIG. 3A is a block diagram illustrating a detailed configuration of the RIP 128 in the present exemplary embodiment. FIG. 3B is a block diagram illustrating a modified example of the RIP 128. As illustrated in FIG. 3A, the RIP 128 in the present exemplary embodiment includes a circuit as the back image decompression unit 213, an image forming processor 350, and communication memory (0) 320.

The communication memory (0) 320 is a storage device for temporarily storing data. Since the communication memory (0) 320 is a static RAM (SRAM), the communication memory (0) 320 can be accessed at a high speed. In addition, the communication memory (0) 320 is used for FIFO-type communication. Thus, a processing unit of a data reception source is configured to be capable of acquiring data in input order of the data to the communication memory (0) 320 by a processing unit of a data transfer source. With this configuration, the data to be acquired by the processing unit of the data reception source is uniquely determined, and the data transfer source can thus prepare, in advance, the data to be received by the data reception source. Further, the data transfer source has a configuration in which the data can be acquired at a higher speed than in data access on the RAM 122 which carries out a selection and preparation process of the data to be transferred in response to a request of the data reception source. The back image decompression unit 213 and the communication memory (0) 320 are connected to each other by two signal lines (control signal line and data signal line). The image forming processor 350 and the communication memory (0) 320 are connected to each other by two signal lines (control signal line and data signal line).

The image forming processor 350 functions, by executing a program, as the closed region generation unit 210, the pixel data generation unit 215, the back image acquisition unit 214, and the pixel data combination unit 216. The functions of the image forming processor 350 may be implemented by a plurality of processors. For example, as illustrated in FIG. 3B, image forming processors 300, 301, and 302 may be used. In that case, communication memories are used for communication between the image forming processors 300, 301, and 302. For example, in FIG. 3B, communication memories 322, 323, and 324 are used for the communication between the image forming processors 300, 301, and 302. In one embodiment, a FIFO-type SRAM is used as the communication memories 322, 323, and 324, similar to the communication memory 320.

<Description of Print Process of Transferred PDL Data in Image Forming Apparatus>

A series of processes in a PDL data print process will be described. The series of processes correspond to processes performed in steps S154 to S158. First, the CPU 121 loads a program to be executed from the ROM 123 into the RAM 122, and executes the program. As a result, the image forming apparatus 100 causes the CPU 121 to execute the series of processes in the PDL data print process described above. In addition, the CPU 121 loads a program to be executed by the RIP 128 from the ROM 123 into the RAM 122, and executes the program in a similar manner.

FIG. 4 is a flowchart illustrating a flow of the series of processes in the PDL data print process in the present exemplary embodiment. First, PDL data is transmitted from the host computer to the image forming apparatus 100. The CPU 121 then stores the received PDL data in the HDD 124. Next, in step S401, the CPU 121 performs an acquisition process of the transmitted PDL data and performs an analysis process of the acquired PDL data. Next, in step S402, the CPU 121 performs a generation process of intermediate data 220 for generation of a bitmap image based on information of the analyzed PDL data. The generation process of the intermediate data described here is performed by a known technique. Next, in step S403, the CPU 121 causes the RIP 128 to perform a rendering process based on the generated intermediate data 220 to generate bitmap data representing a page image. The print process is achieved by performing predetermined image processing on the generated bitmap data and then transferring the resultant data to the printer mechanism 111.

<Details of Rendering Process (Step S403) in First Exemplary Embodiment>

Figure 6B:
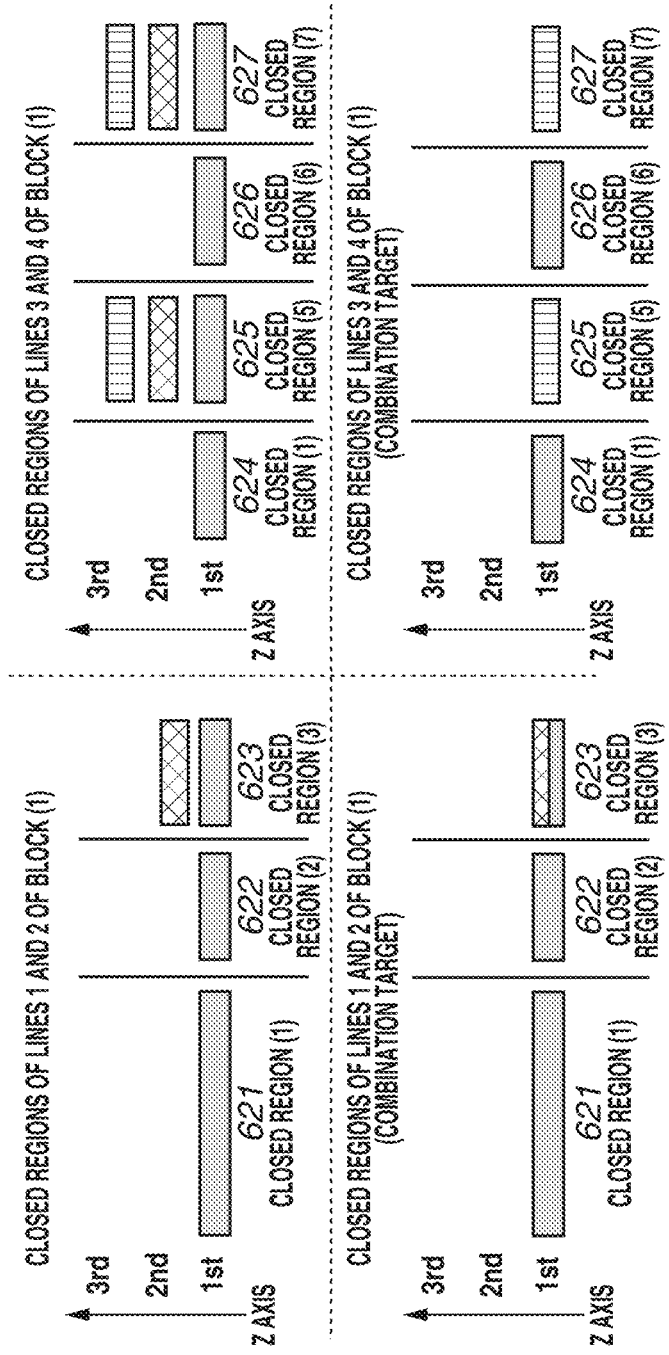
FIG. 6B is a diagram illustrating layer configurations in the image generation process.

FIG. 5 is a flowchart illustrating a detailed flow of the rendering process performed in step S158 by the RIP 128. FIG. 6A is a diagram illustrating a closed region in an image generation process. FIG. 6B is a diagram illustrating a layer configuration in the image generation process. FIG. 7A is a diagram illustrating data structures of the closed regions. FIG. 7B is a diagram illustrating data structures of the closed regions after elimination of a hidden surface.

In the rendering process, in step S501, the image forming processor 350 of the RIP 128 generates a closed region based on the intermediate data 220. The closed region is calculated from the contour information of the drawing object. A known technique is used as a method of generating the closed region. The closed region will be described with reference to FIGS. 6A and 6B. An output page image 604 is an image obtained by arranging objects acquired from the PDL data. An output page image 603 includes a back image object 601, a drawing object (1) 602, and a drawing object (2) 603.

In the present exemplary embodiment, the RIP 128 divides the page information into blocks having a predetermined size at the time of performing the image formation process. For example, the output page image 604 is divided into blocks such as a block (1) 611, a block (2) 612, a block (3) 613, a block (4) 614, and a block (5) 615. In addition, the RIP 128 executes an image formation process on the divided blocks for each line. As illustrated in FIG. 7A, the block (1) 611 can be divided into lines 1 to 4. In addition, the block (1) 611 can be divided into a closed region (1) 621, a closed region (2) 622, a closed region (3) 623, a closed region (4) 624, a closed region (5) 625, a closed region (6) 626, and a closed region (7) 627. The closed region is detected based on contour information of a drawing object on one line. The respective closed regions (1) 621 to (7) 627 include different combinations of drawing objects from each other, so that image formation processes appropriate for the respective closed regions (1) 621 to (7) 627 are performed.

For example, as illustrated in FIG. 6B, each closed region includes the following drawing objects. The closed region (1) 621 includes only the back image object 601. The closed region (2) 622 includes only the back image object 601. The closed region (3) 623 includes the back image object 601 and the drawing object (1) 602. The closed region (4) 624 includes only the back image object 601. The closed region (5) 625 includes the back image object 601, the drawing object (1) 602, and the drawing object (2) 603. The closed region (6) 626 includes only the back image object 601. The closed region (7) 627 includes the back image object 601, the drawing object (1) 602, and the drawing object (2) 603.

As illustrated in FIG. 6A, each closed region includes closed region management information and closed region object data. The closed region management information includes "Pixel length" information and information regarding "the number of objects". The closed region object data includes "Fill type" information and "combination" information.

The "Pixel length" information indicates a region length of the closed region. The information regarding "the number of objects" indicates the number of objects included in the closed region. The closed region object data includes "Fill type" information indicating types of the drawing objects and "combination" information indicating a method of combining the drawing objects. Examples of the "Fill type" information include a "back image" such as the back image object 601 and an "image" such as the drawing object (1) 602 and the drawing object (2) 603. Here, the drawing object (1) 602 is identified as an "image (intersection)", and the drawing object (2) 603 is identified as an "image (longitudinal line)".

With respect to such information of the closed region, the image forming processor 350 of the RIP 128 performs, using a known technique, a closed region generation process in step S501 and a hidden surface elimination process in step S502. The hidden surface elimination process is a process of excluding, from a combination target, drawing object information that does not have an influence on a combination result of an image. In the closed region (3) 623, the drawing object (1) 602 and the back image object 601 are objects that have an influence on the combination result. For this reason, the hidden surface elimination process is not performed. On the other hand, in the closed region (5) 625 and the closed region (7) 627, the drawing object (1) 602 and the back image object 601 are objects that do not have an influence on the combination result. For this reason, the hidden surface elimination process is performed in these regions. In this way, the data structures of the closed regions illustrated in FIG. 7A become the data structures of the closed regions after elimination of the hidden surface illustrated in FIG. 7B by the hidden surface elimination process.

When comparing FIGS. 7A and 7B with each other, it can be seen that Fill type: image (intersection) is deleted in the closed regions (5) 625 and (7) 627. In addition, in the closed regions (5) 625 and (7) 627, it can be seen that Fill type: back image is changed into Fill type: back image (read and discard). Details of the back image (read and discard) will be described below.

Next, in step S503, the image forming processor 350 of the RIP 128 determines whether information regarding a page on which the image formation process is performed is information regarding a page including the back image object. The determination of whether the back image object is included is made based on a data content of the intermediate data 220. In a case where the image forming processor 350 determines that the page includes the back image object (Yes in step S503), the processing proceeds to step S504. On the other hand, in a case where the image forming processor 350 determines that the page does not include the back image object (No in step S503), the processing proceeds to step S505.

In step S504, the image forming processor 350 performs control so that the back image compressed data 221 is transmitted to the back image decompression unit 213. In this way, in step S504, the image forming processor 350 causes the back image decompression unit 213 to decompress the back image compressed data 221. As described above, the back image compressed data 221 may be the image data generated by the fallback process.

Since the decompressed back image data has information regarding all surfaces of a page region, the decompressed back image data has a very large data size (a large data amount). Accordingly, in the present exemplary embodiment, the back image decompression unit 213 performs a process of transferring the decompressed back image data to the image forming processor 350 via the communication memory (0) 320, which can be accessed at a high speed, without storing the decompressed back image data in the memory. In addition, the communication memory (0) 320 is used in a FIFO-type communication scheme. Since the FIFO-type communication scheme is a scheme of sequentially transmitting data based on a predetermined rule, the transfer process can be executed at a higher speed compared to a case of using the general-purpose RAM 122. The data transfer process using the communication memory (0) 320 will be described in detail below.

Next, the image forming processor 350 performs a generation process of pixel data for each drawing object existing in each closed region. In step S505, pixel data of the back image is also generated based on the pixel data of the back image transferred from the back image decompression unit 213.

Next, in step S506, the image forming processor 350 of the RIP 128 performs a combination process based on the closed region data and the pixel data generated in step S505 and generates a bitmap image of a final page or a back image in the fallback process.

<Details of Back Image Decompression/Transfer Process (Step S504) in First Exemplary Embodiment>

Figure 8:
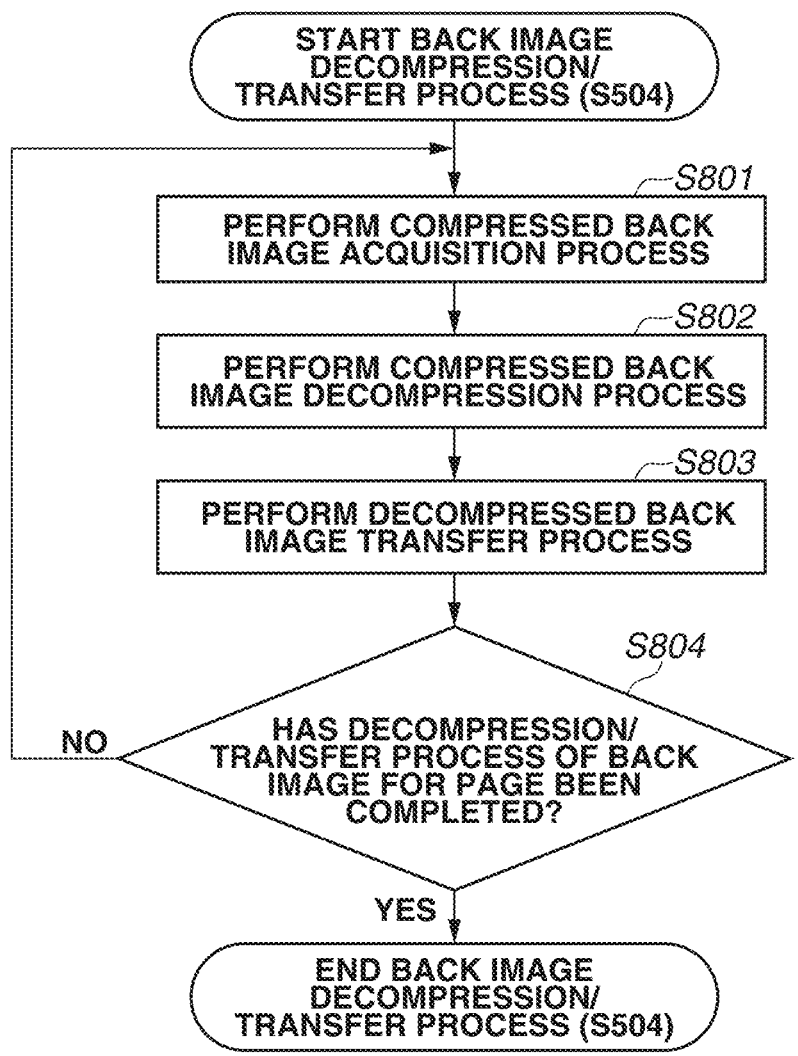
FIG. 8 is a flowchart illustrating a flow of a back image decompression/transfer process.

FIG. 8 is a flowchart illustrating a flow of the back image decompression/transfer process performed in step S504. In the back image decompression/transfer process, in step S801, the back image decompression unit 213 of the RIP 128 performs an acquisition process of the back image compressed data 221 based on a back image decompression instruction.

Next, in step S802, the back image decompression unit 213 performs a decompression process of the acquired back image compressed data 221. Next, in step S803, the back image decompression unit 213 transfers the decompressed back image data to the communication memory (0) 320. The transfer is performed by the FIFO-type communication scheme. Accordingly, the back image decompression unit 213 and the back image acquisition unit 214 perform transfer and acquisition processes in a predetermined data order.

Next, in step S804, the back image decompression unit 213 determines whether a decompression/transfer process of a back image for a page has been completed. In a case where it is determined that the decompression/transfer process has not been completed (No in step S804), the processing proceeds to step S801, and in a case where it is determined that the decompression/transfer process is completed (Yes in step S804), the processing ends.

<Details of Pixel Data Generation Process (Step S505) in First Exemplary Embodiment>

Figure 9:
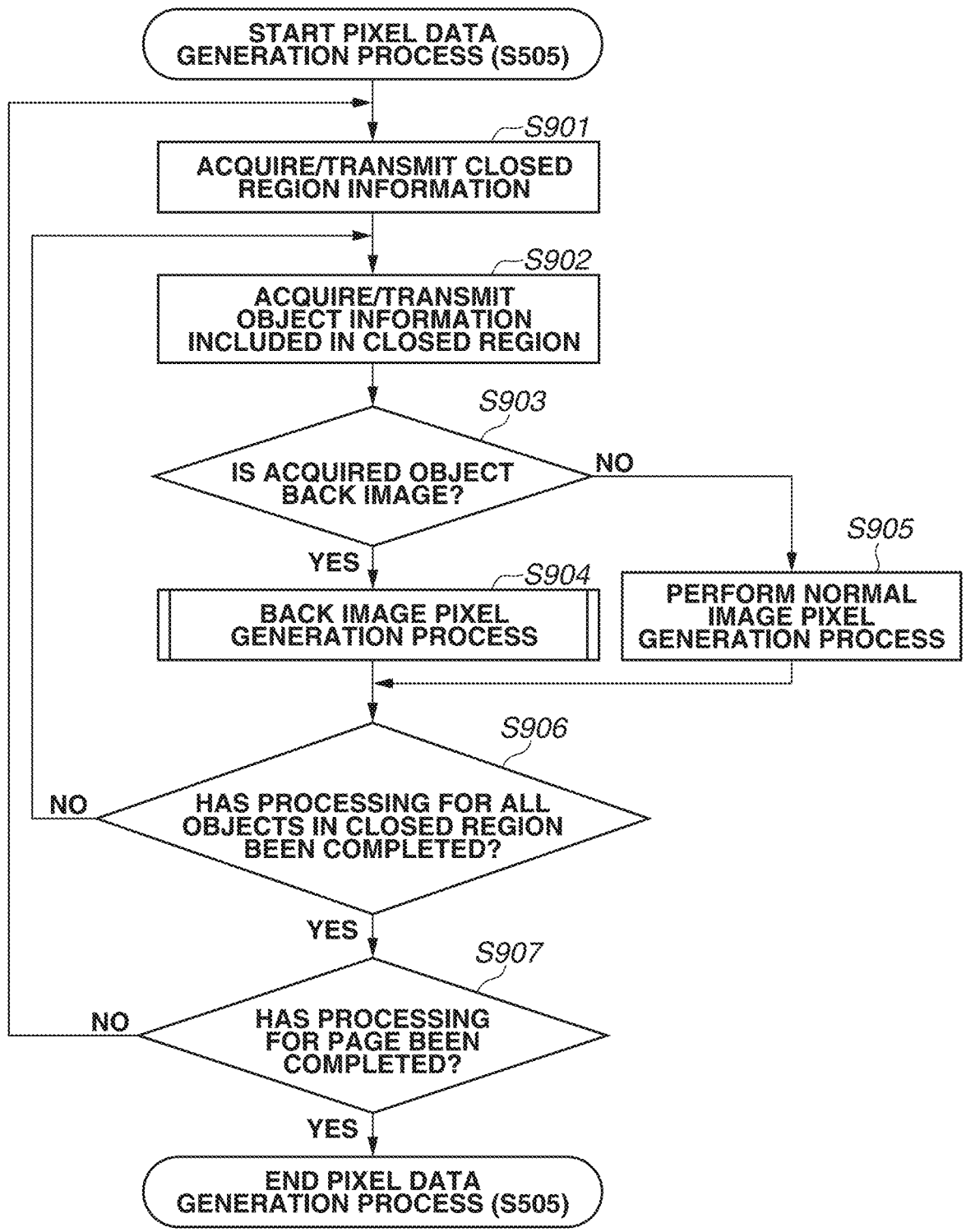
FIG. 9 is a flowchart illustrating a flow of a pixel data generation process.

FIG. 9 is a flowchart illustrating a detailed flow of the pixel data generation process performed in step S505 in FIG. 5 in the present exemplary embodiment. In the pixel data generation process, in step S901, the pixel data generation unit 215 acquires the closed region information generated by the closed region generation unit. Next, in step S902, the pixel data generation unit 215 performs an acquisition/transmission process of the object information included in the closed region acquired in step S901. Next, in step S903, the pixel data generation unit 215 determines a value designated as a "Fill type" of an object acquired in step S902. In a case where the "Fill type" is the back image (Yes in step S903), the processing proceeds to step S904. On the other hand, in a case where the "Fill type" is other than the back image (No in step S903), the processing proceeds to step S905. In step S904, a back image pixel generation process is performed. In step S905, a normal image pixel generation process is performed. The pixel data generated by the pixel data generation unit 215 is transmitted to the pixel data combination unit 216 and subjected to the combination process in unit of closed region. Next, in step S906, the pixel data generation unit 215 determines whether processing for all the objects (processing targets) in a closed region have been completed. In a case where it is determined that the processing has been completed (Yes in step S906), the processing proceeds to step S907. In a case where it is determined that the processing has not been completed (No in step S906), the processing proceeds to step S902. In step S907, the pixel data generation unit 215 determines whether processing for all the closed regions included in the page information have been completed. In a case where it is determined that the processing has not been completed (No in step S907), the processing returns to step S901. In a case where it is determined that the processing has been completed (Yes in step S907), the processing ends.

<Details of Back Image Pixel Generation Process (Step S904) in First Exemplary Embodiment>

FIG. 10A is a flowchart illustrating a flow of the back image pixel generation process performed in step S904. In the back image pixel generation process, in step S1001, the pixel data generation unit 215 acquires "Pixel length" information and "Fill type" information included in the closed region information. Then, in step S1002, the pixel data generation unit 215 determines whether read and discard information is included in the "Fill type" information. The "Fill type" information in which the read and discard information is included is "Fill type: back image (read and discard)". The "Fill type: back image (read and discard)" is a back image determined not to have an influence on a combination result in a hidden surface elimination step. That is, the pixel data generation unit 215 determines whether a back image pixel is a back image pixel required for generation of the pixel data or a back image pixel not required for generation of the pixel data.

In a case where the read and discard information is not included (No in step S1002), the processing proceeds to step S1003. In a case where the read and discard information is included (Yes in step S1002), the processing proceeds to step S1006.

In step S1004, the pixel data generation unit 215 requests the back image acquisition unit 214 to acquire the back image. At this time, the "Pixel length" information acquired in step S1001 is transmitted to the back image acquisition unit 214. The back image acquisition unit 214 performs a process of acquiring data of the requested "Pixel length" from the communication memory (0) 320. Next, in step S1005, the back image acquisition unit 214 transmits the acquired back image data to the pixel data generation unit 215. The pixel data generation unit 215 acquires the transmitted back image data, and the processing ends.

In step S1006, the pixel data generation unit 215 requests the back image acquisition unit 214 to read and discard the back image. At this time, the "Pixel length" information acquired in step S1001 is transmitted to the back image acquisition unit 214. In step S1006, the back image acquisition unit 214 performs a process of acquiring back image data of the requested "Pixel length". Then, in step S1007, the back image acquisition unit 214 deletes the back image data without transmitting the back image data to the pixel data generation unit 215. In this way, the processing ends without acquiring the back image data by the pixel data generation unit 215.

<Details of Normal Image Pixel Generation Process (Step S905) in First Exemplary Embodiment>

FIG. 10B is a flowchart illustrating a flow of the normal image pixel generation process performed in step S905. In the normal image pixel generation process, in step S1011, the pixel data generation unit 215 acquires "Pixel length" information, "Fill type" information, and object information included in the closed region information. In step S1012, the pixel data generation unit 215 designates an address with respect to the RAM 122, and requests data of the object. Then, in step S1013, the pixel data generation unit 215 waits for address determination/data acquisition/data transfer in the RAM 122. Then, in step S1014, the pixel data generation unit 215 acquires object data transferred from the RAM 122. Then, in step S1015, the pixel data generation unit 215 generates pixel data of the "Pixel length" based on the acquired object information.

<Pixel Data Generation Flow for Each Closed Region in First Exemplary Embodiment>

Figure 11A:
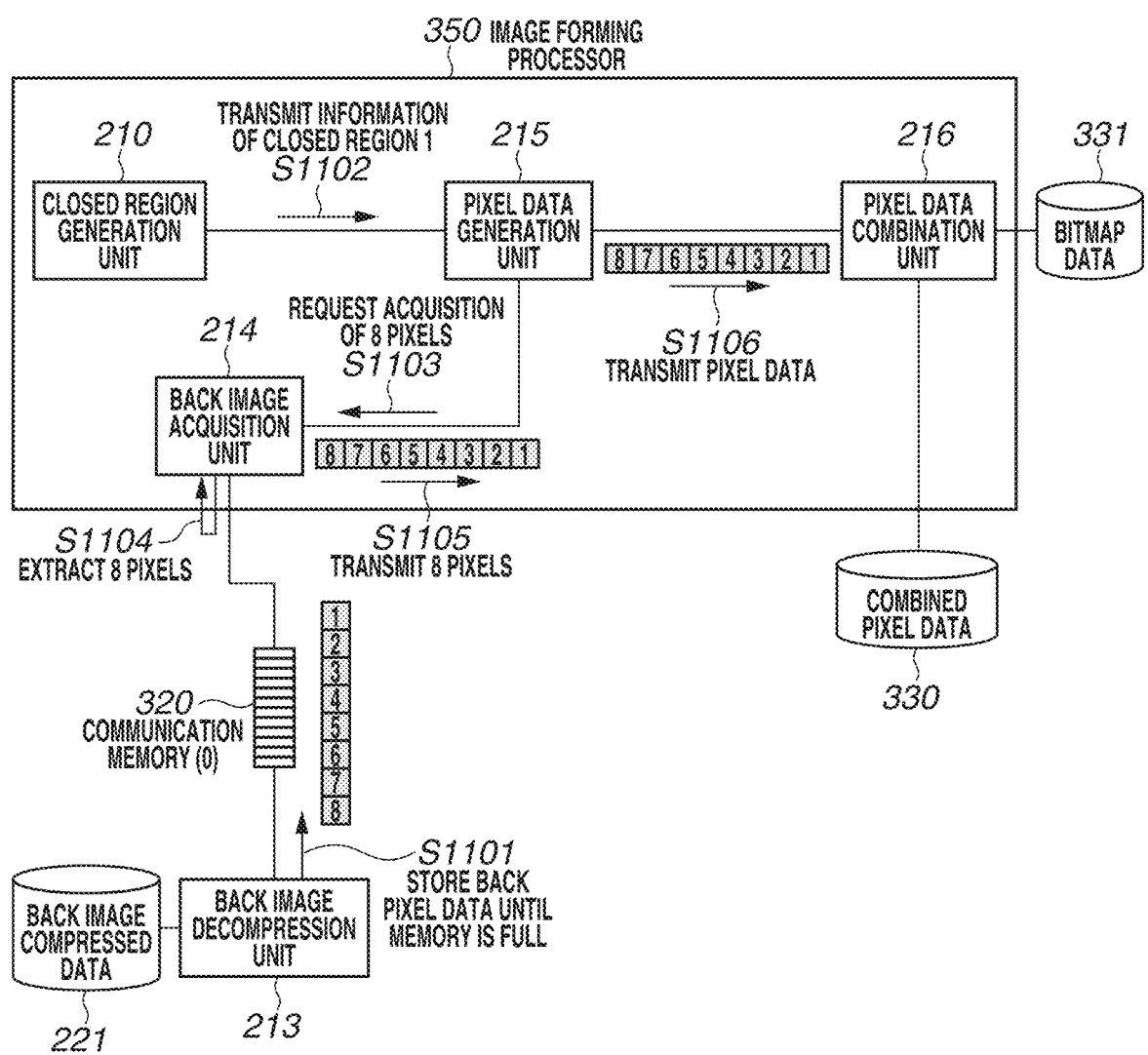
FIG. 11A is a block diagram illustrating an aspect of data exchange at the time of generating image data of a closed region.
Figure 11B:
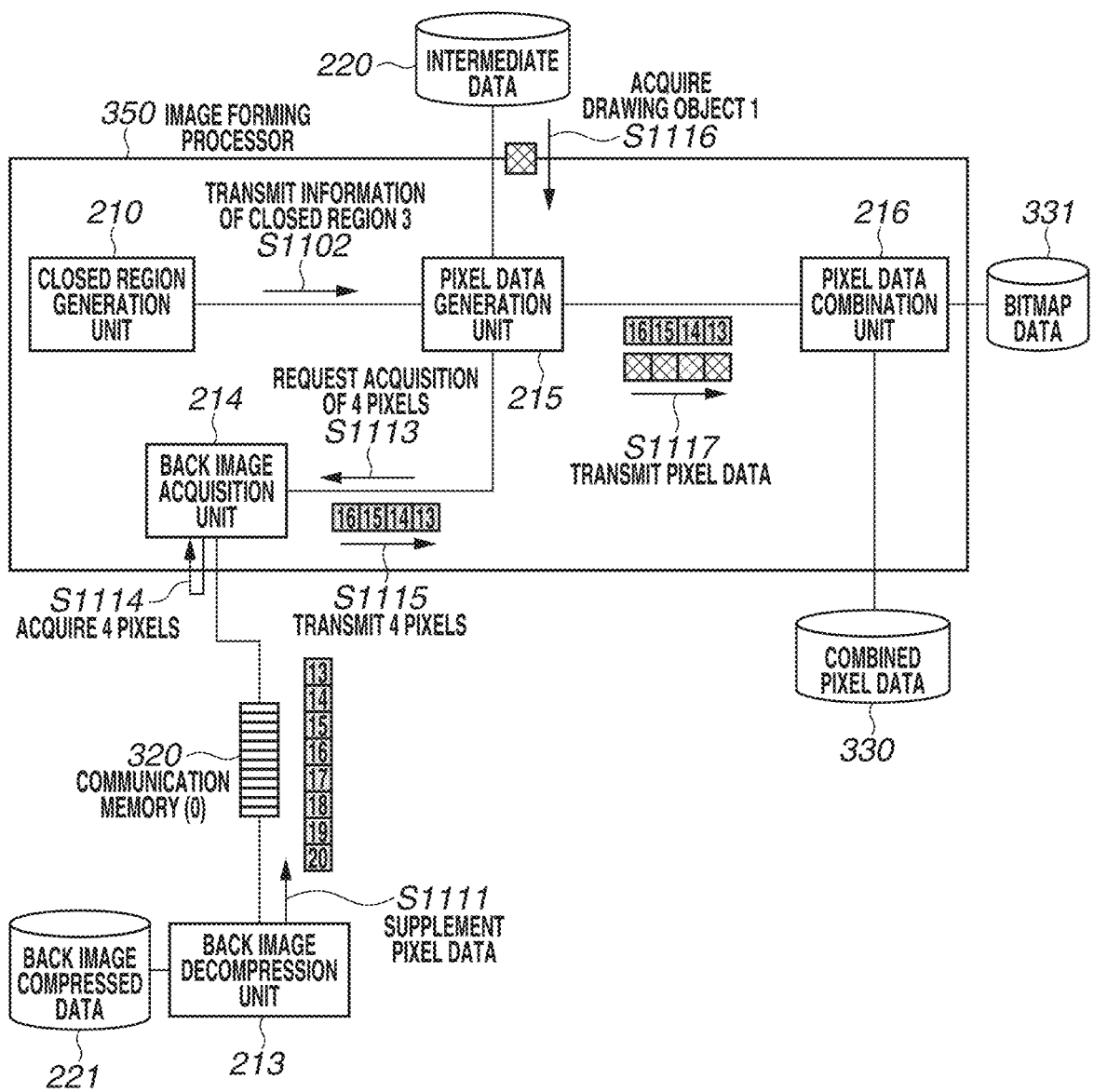
FIG. 11B is a block diagram illustrating an aspect of data exchange at a time of generating image data of a closed region.
Figure 11C:
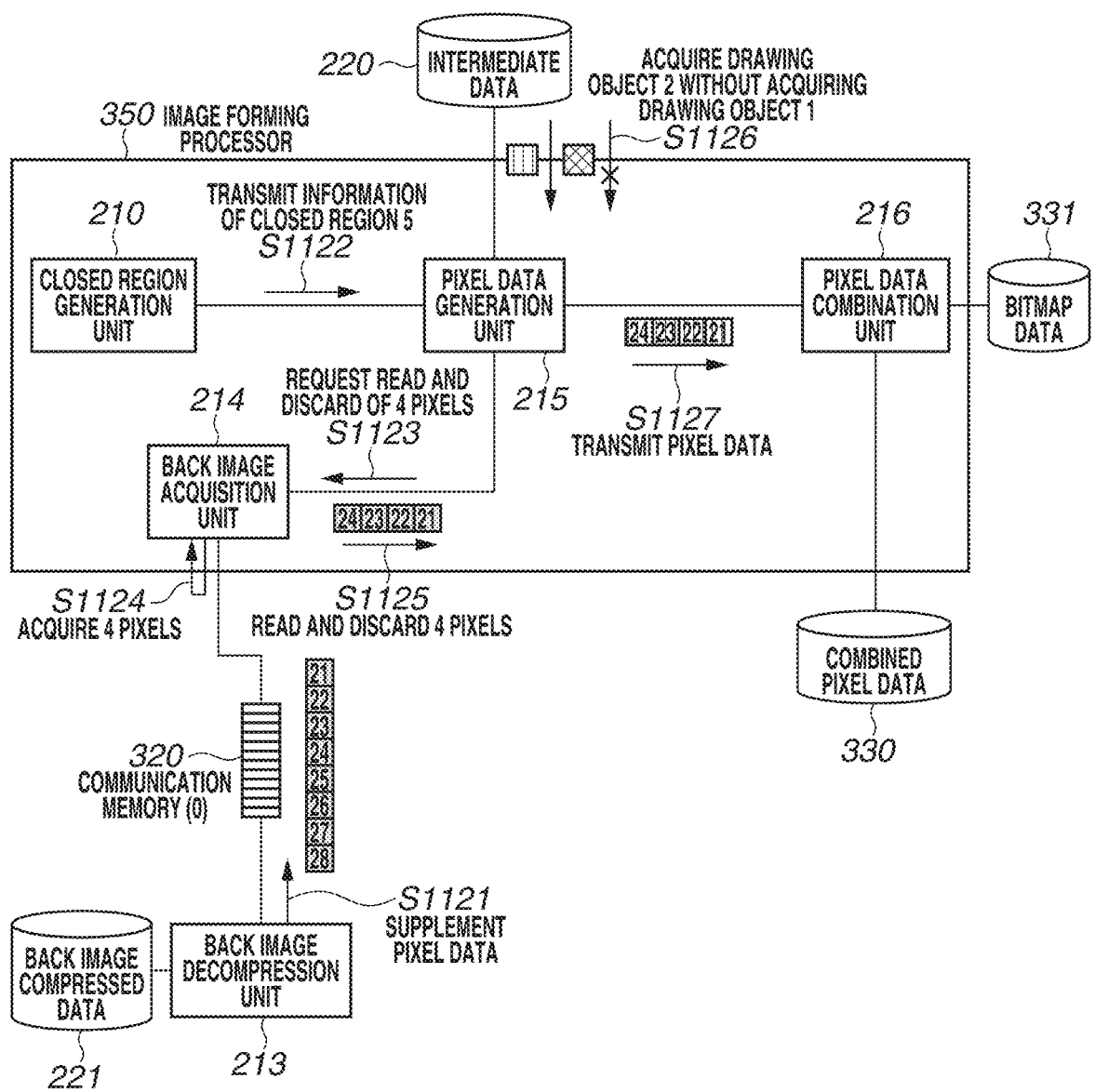
FIG. 11C is a block diagram illustrating an aspect of data exchange at a time of generating image data of a closed region.

FIG. 11A is a block diagram illustrating a state of data exchange at the time of generating image data of the closed region (1) 621. FIG. 11B is a block diagram illustrating a state of data exchange at the time of generating image data of the closed region (3) 623. FIG. 11C is a block diagram illustrating a state of data exchange at the time of generating image data of the closed region (5) 625.

First, a case of generating pixel data of the closed region (1) 621 illustrated in FIGS. 6A to 7B will be described. As illustrated in FIG. 11A, in step S1101, the back image decompression unit 213 decompresses the back image compressed data 221, and stores the decompressed back image compressed data 221 sequentially from a head pixel in the communication memory (0) 320. In step S1102, the closed region generation unit 210 transmits information of the closed region (1) 621 to the pixel data generation unit 215. In step S1103, the pixel data generation unit 215 transmits pixel information of 8 pixels and an acquisition request to the back image acquisition unit 214. In step S1104, the back image acquisition unit 214 performs a process of reading data by the 8 pixels from the communication memory (0) 320. In step S1105, the back image acquisition unit 214 transmits the acquired data by the 8 pixels to the pixel data generation unit 215. In step S1106, the pixel data generation unit 215 transmits the acquired data to the pixel data combination unit. In addition, the data transmitted to the pixel data combination unit 216 is subjected to the combination process, if necessary, and stored as combined pixel data 330. When a predetermined amount of the combined pixel data 330 is accumulated, the pixel data combination unit 216 outputs bitmap data 331 based on the combined pixel data.

Next, a case of generating pixel data of the closed region (3) 623 illustrated in FIGS. 6A to 7B will be described. As illustrated in FIG. 11B, in step S1111, the back image decompression unit 213 stores the pixel data in the communication memory (0) 320 as soon as a vacant area is generated in the communication memory (0) 320. In step S1112, the closed region generation unit 210 transmits information of the closed region (3) 623 to the pixel data generation unit 215. In step S1113, the pixel data generation unit 215 transmits pixel length information of 4 pixels and an acquisition request to the back image acquisition unit 214. In step S1114, the back image acquisition unit 214 performs a process of reading data of the 4 pixels from the communication memory (0) 320. In step S1115, the back image acquisition unit 214 transmits the acquired data of the 4 pixels to the pixel data generation unit 215. In step S1116, the pixel data generation unit 215 acquires the drawing object (1) 602. Then, in step S1117, pixel data of the 4 pixels acquired from the back image acquisition unit 214 and pixel data of the 4 pixels based on the drawing object (1) 602 are transmitted to the pixel data combination unit 216. The data transmitted to the pixel data combination unit 216 is subjected to the combination process, if necessary, and stored as combined pixel data 330. When a predetermined amount of the combined pixel data 330 is accumulated, the pixel data combination unit 216 outputs bitmap data 331 based on the combined pixel data.

Next, a case of generating pixel data of the closed region (5) 625 illustrated in FIGS. 6A to 7B will be described. As illustrated in FIG. 11C, in step S1121, the back image decompression unit 213 stores the pixel data in the communication memory (0) 320 as soon as a vacant area is generated in the communication memory (0) 320. In step S1122, the closed region generation unit 210 transmits information of the closed region (5) 625 to the pixel data generation unit 215. In step S1123, the pixel data generation unit 215 transmits pixel length information of 4 pixels and an acquisition request to the back image acquisition unit 214. In step S1124, the back image acquisition unit 214 performs a process of reading data of 4 pixels from the communication memory (0) 320. In step S1125, the back image acquisition unit 214 deletes the acquired data of the 4 pixels without transmitting the acquired data by the 4 pixels to the pixel data generation unit 215. In step S1126, the pixel data generation unit 215 acquires the drawing object (2) 603 without acquiring drawing object (1) 602. In step S1127, pixel data of 4 pixels based on the drawing object 2 are transmitted to the pixel data combination unit 216. The data transmitted to the pixel data combination unit 216 is subjected to the combination process, if necessary, and stored as combined pixel data 330. When a predetermined amount of the combined pixel data 330 is accumulated, the pixel data combination unit 216 outputs bitmap data 331 based on the combined pixel data.

As described above, in the present exemplary embodiment, normal drawing objects are acquired from the RAM, and the back image is acquired from the FIFO-type communication memory. In other words, only the back image is acquired from the FIFO-type communication memory, and drawing objects other than the drawing object of the back image are acquired from the RAM. In this way, pixel data can be acquired from the memory without designating an address, so that high-speed processing can be achieved. Accordingly, in the present exemplary embodiment, a process is performed in which back pixels that do not have an influence on the combination result are extracted and deleted from the communication memory (0) 320. As a result, back pixel data arranged at a head position of the memory becomes back pixel data to be used for the next closed region, so that data can be appropriately acquired. The back image data has been used as an example of the data acquired from the FIFO-type communication memory in the present exemplary embodiment, but other data may be used. The aspect of the embodiments is directed to reducing a loading time of large size data among drawing objects used for combining images. Therefore, for example, when large size data is detected in the intermediate data generation process performed in step S402, the large size data may be acquired from the FIFO memory, instead of the back image. Examples of the large size data include data having pixel values in all of image regions.

In the first exemplary embodiment, the pixel data of the back image is acquired using the communication memory. In a second exemplary embodiment, in addition to the pixel data, attribute data of the back image is acquired using the communication memory. The attribute data is data of an original object attribute (e.g., category information such as a text, a drawing, or an image) that is left at the time of generating a back image by a fallback process, for example. By storing such attribute data, it becomes possible to perform various image correction processes such as a process of thickening pixels of a text attribute. Components of the second exemplary embodiment are similar to those of the first exemplary embodiment except for some of the components. For this reason, similar components will be denoted by the same reference numerals, and a detailed description thereof is omitted.

<Hardware and Software Configurations in RIP 128 in Second Exemplary Embodiment>

Figure 12A:
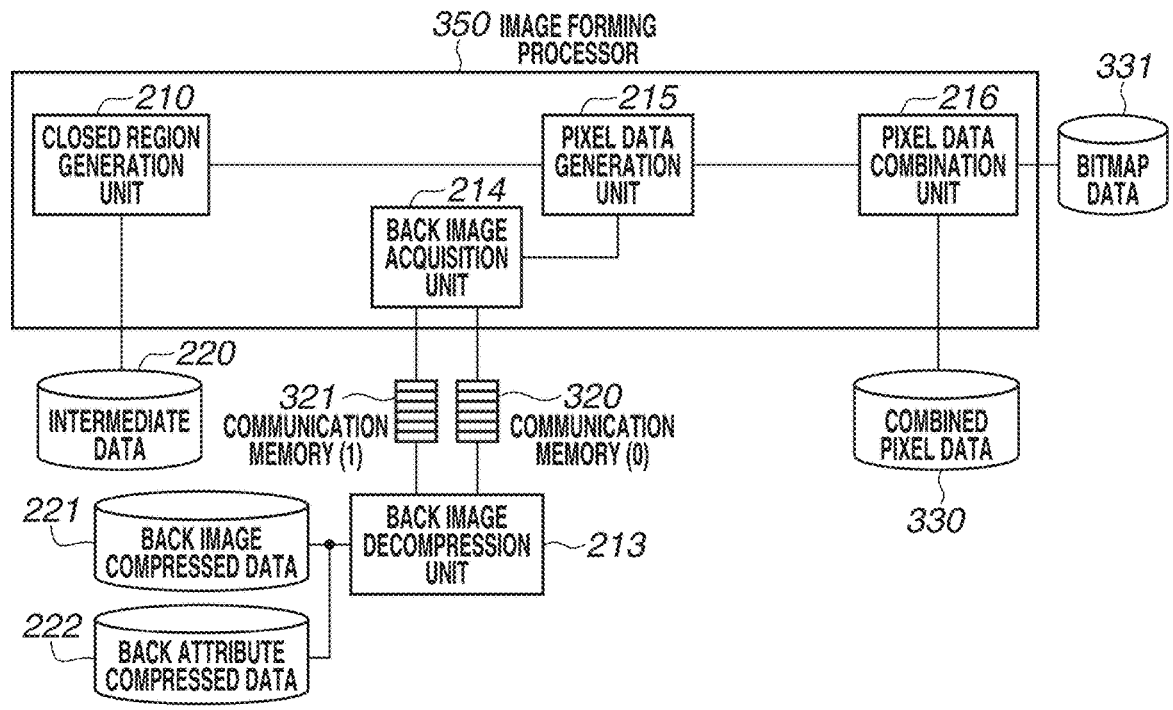
FIG. 12A is a block diagram illustrating a detailed configuration of an RIP according to a second exemplary embodiment.
Figure 12B:
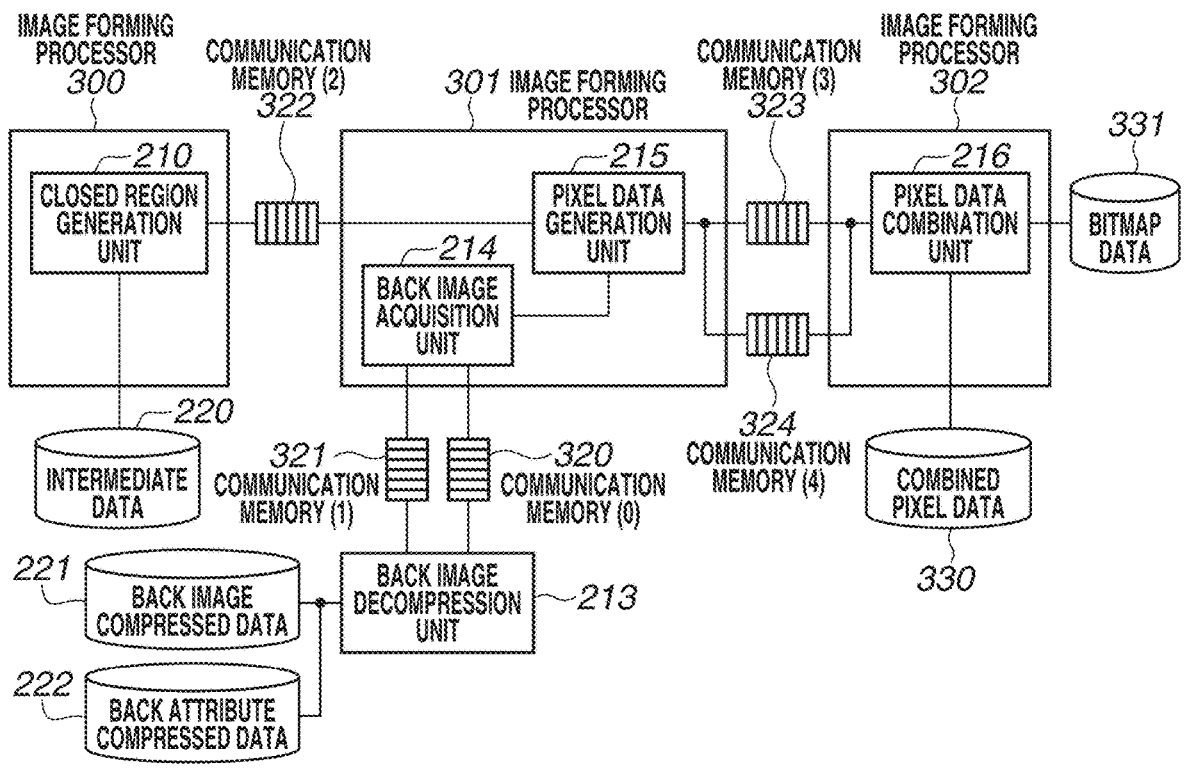
FIG. 12B is a block diagram illustrating a modified example of the RIP.

FIG. 12A is a block diagram illustrating a detailed configuration of an RIP 128 in the second exemplary embodiment. FIG. 12B is a block diagram illustrating a modified example of the RIP 128. In the second exemplary embodiment, back attribute compressed data 222 and a communication memory (1) 321 are added as illustrated in FIG. 12A.

A back image decompression unit 213 is a processing unit that decompresses back image compressed data 221 and transfers the decompressed back image compressed data 221 to an image forming processor 350 via a communication memory (0) 320, as in the first exemplary embodiment. In addition, the back image decompression unit 213 is a processing unit that decompresses the back attribute compressed data 222 and transfers the decompressed back attribute compressed data to the image forming processor via the communication memory (1) 321.

In the present exemplary embodiment, it should be noted that, since purposes of the communication memory (0) 320 and the communication memory (1) 321 are different from each other, sizes of data that can be stored in the communication memory (0) 320 and the communication memory (1) 321 are different from each other.

Since the communication memory (0) 320 is used to transfer decompressed image data, the communication memory (0) 320 has a data width with which color information such as CMYK and RGB indicating pixels can be stored. For example, in a case where one channel has a length of about 8 bits, the communication memory (0) 320 holds a data width of a length of 32 bits for the CMYK, and the communication memory (0) 320 holds a data width of a length of 24 bits for the RGB.

On the other hand, the communication memory (1) 321 transfers decompressed attribute data. For this reason, it is sufficient that the communication memory (1) 321 has a data width with which attribute information corresponding to the image can be stored. It is sufficient that the attribute data holds a data width of a length of 8 bits. As described above, a size of data that can be stored in the communication memory (1) 321 is smaller than a size of data that can be stored in the communication memory (0) 320.

In addition, the functions of the image forming processor 350 may be implemented by a plurality of processors. For example, as illustrated in FIG. 3B, the image forming processors 300, 301, and 302 may be used. In that case, communication memories are used for communication between the image forming processors 300, 301, and 302. For example, in FIG. 12B, the communication memories 322, 323, and 324 are used for the communication between the image forming processors 300, 301, and 302. In one embodiment, a FIFO-type SRAM is used as the communication memories 322, 323, and 324, similar to the communication memory 320.

<Pixel Data Generation Flow in Second Exemplary Embodiment>

Figure 13:
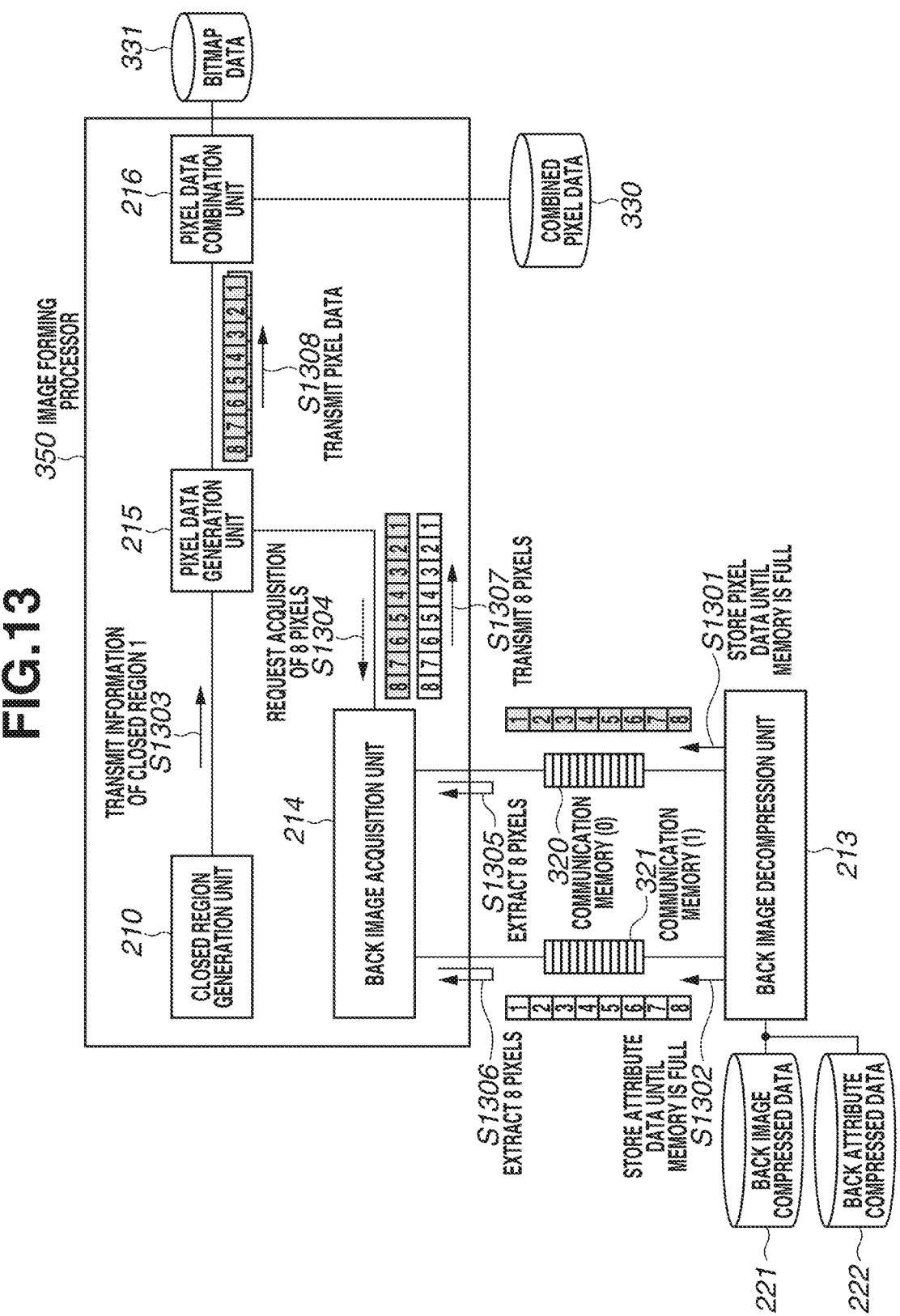
FIG. 13 is a block diagram illustrating an aspect of data exchange at a time of generating image data according to the second exemplary embodiment.

FIG. 13 is a block diagram illustrating a state of data exchange at the time of generating image data in the second exemplary embodiment. A case of generating pixel data in the second exemplary embodiment will be described. As illustrated in FIG. 13, in step S1301, the back image decompression unit 213 decompresses the back image compressed data 221, and stores the decompressed back image compressed data 221 sequentially from a head pixel in the communication memory (0) 320. In addition, in step S1302, the back image decompression unit 213 decompresses the back attribute compressed data 222, and stores the decompressed back attribute compressed data 222 sequentially from attribute data of a head pixel in the communication memory (1) 321. In step S1303, a closed region generation unit 210 transmits closed region information to a pixel data generation unit 215. At this time, for example, information of a closed region (1) 621 is transmitted. In step S1304, the pixel data generation unit 215 transmits information regarding a pixel length indicated by the closed region information and an acquisition request to a back image acquisition unit 214. In this case, 8 pixels are designated. As in the first exemplary embodiment, in a case of a closed region (3) 623, a read and discard request is transmitted, and pixel data and attribute data are not received. In step S1305, the back image acquisition unit 214 performs a process of reading pixel data of a designated pixel length from the communication memory (0) 320. At this time, pixel data of the 8 pixels is read. Further, in step S1306, the back image acquisition unit 214 performs a process of reading attribute data of a designated pixel length from the communication memory (1) 321. In step S1307, the back image acquisition unit 214 transmits the acquired pixel data and attribute data to the pixel data generation unit 215. The pixel data and attribute data used for processing the closed region (3) 623 are deleted without being transmitted. Next, the pixel data generation unit 215 generates a back image and a back attribute as pixel data indicating the back image and the back attribute as one piece of pixel information, based on the closed region information, the back pixel data, and the back attribute data. The pixel data generation unit 215 transmits the generated pixel data to a pixel data combination unit 216. The data transmitted to the pixel data combination unit 216 is subjected to the combination process, if necessary, and stored as combined pixel data 330. When a predetermined amount of combined pixel data 330 is accumulated, the pixel data combination unit 216 outputs bitmap data 331 based on the combined pixel data.

According to exemplary embodiments of the disclosure, it is possible to provide an image processing apparatus capable of suppressing a processing time in an image generation process using drawing objects requiring a long time for acquisition.

In addition, the exemplary embodiments of the disclosure may be applied to a system including a plurality of devices or may be applied to an apparatus including a single device.

The disclosure is not limited to the exemplary embodiments described above, and various modifications (including organic combinations of the respective exemplary embodiments) can be made without departing from the spirit of the disclosure. These modifications are not excluded from the scope of the disclosure. That is, all combinations of the exemplary embodiments described above and modified examples thereof are also included in the disclosure.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-073489, filed Apr. 5, 2018, which is hereby incorporated by reference herein in its entirety.

What is claimed is:
1. An apparatus comprising:
a controller including a processor and a memory, the controller configured to:
rasterize data of a first object to generate image data;
compress the generated image data in a first memory;

decompress the compressed image data and store the decompressed image data into a second memory, which is a first-in first-out (FIFO) memory;

acquire data of a second object from a third memory, which is a random access memory (RAM) by designating an address in the third memory;

acquire the decompressed image data from the first-in first-out (FIFO) memory; and generate combined image data representing at least the first object and the second object by rasterizing the acquired data of the second object based on the acquired decompressed image data.

2. The apparatus according to claim 1,
wherein the at least one of one or more processors and the integrated circuit further executes:
an intermediate data generation task of generating intermediate data from a page description language (PDL) data; and
a pixel data generation task of generating pixel data of the first object based on the intermediate data and generating pixel data of the second object based on the intermediate data,
wherein first pixel data including the pixel data of the first object is stored in the first memory and second pixel data including the pixel data of the second object is stored in the second memory, and
wherein, in the bitmap image generation task, the bitmap image is generated by combining the first pixel data acquired from the first memory in the first acquiring task and the second pixel data acquired from the second memory in the second acquiring task.

3. The apparatus according to claim 2,
wherein the at least one of one or more processors and the integrated circuit further executes control so as to compress the pixel data which includes the pixel data of the second object and store the compressed pixel data in a third memory, in a case where a total of sizes of the generated pixel data including the pixel data of the second object exceeds a predetermined size, and
wherein the pixel data including the pixel data of the second object in the third memory is decompressed and is stored in the second memory.

4. The apparatus according to claim 1, further comprising an image forming device configured to form an image on a sheet,
wherein the image forming device forms the image based on the generated combined image data.

5. The apparatus according to claim 1, further comprising a display device configured to display information,
wherein the display device displays the information based on the generated combined image data.

6. The apparatus according to claim 1, wherein the controller is further configured to discard a part of the acquired decompressed image data without using the part for generating the combined image data.

7. The apparatus according to claim 6, wherein the part of the acquired decompressed image data is discarded in a case that the part is arranged under a different object.

8. The apparatus according to claim 1, wherein the data of the first object and the second object is pixel data of the first object and the second object, and the controller is further configured to:
acquire attribute data of the first object indicating a type of the first object from the FIFO memory;
acquire attribute data of the second object indicating a type of the second object from the RAM; and
combine the acquired attribute data of the first object and the acquired attribute data of the second object.

9. A method for an apparatus, comprising:
rasterizing data of a first object to generate image data;
compressing the generated image data in a first memory;
decompressing the compressed image data and storing the decompressed image data into a second memory, which is a first-in first-out (FIFO) memory;
acquiring data of a second object from a third memory, which is a random access memory (RAM) by designating an address in the third memory;
acquiring the decompressed image data from the first-in first-out (FIFO) memory; and
generating combined image data representing at least the first object and the second object by rasterizing the acquired data of the second object and based on the acquired decompressed image data.

10. The method according to claim 9, further comprising
generating intermediate data from a page description language (PDL) data; and
generating pixel data of the first object based on the intermediate data and generating pixel data of the second object based on the intermediate data,
wherein first pixel data is stored in the first memory and second pixel data is stored in the second memory, and
wherein the bitmap image is generated by combining the first pixel data in the first acquiring task and the second pixel data in the second acquiring task.

11. The method according to claim 9, wherein the second object is a back image object.

12. The method according to claim 9, further comprising discarding a part of the acquired decompressed image data without using the part for generating the combined image data.

13. The method according to claim 12, wherein the part of the acquired decompressed image data is discarded in a case that the part is arranged under a different object.

14. The method according to claim 9, further comprising:
acquiring attribute data of the first object indicating a type of the first object from the FIFO memory;
acquiring attribute data of the second object indicating a type of the second object from the RAM; and
combining the acquired attribute data of the first object and the acquired attribute data of the second object,
wherein the data of the first object and the second object is pixel data of the first object and the second object.

* * * * *